(12) United States Patent  
Truesdale et al.

(10) Patent No.: US 12,644,481 B2  
(45) Date of Patent: Jun. 2, 2026

(54) QUICK RELEASE PIN MARINE MOUNT SYSTEM FOR QUICK RELEASE ACCESSORIES

(71) Applicant: CompX International Inc., Greenville, SC (US)

(72) Inventors: Tim Truesdale, Grayslake, IL (US); John D Wendt, Oshkosh, WI (US); Michael C Livorsi, Fox Lake, IL (US)

(73) Assignee: CompX International Inc., Dallas, TX (US)

( * ) Notice: Subject to any disclaimer, the term of this patent is extended or adjusted under 35 U.S.C. 154(b) by 509 days.

(21) Appl. No.: 18/323,524

(22) Filed: May 25, 2023

(65) Prior Publication Data

US 2023/0382498 A1 Nov. 30, 2023

Related U.S. Application Data

(60) Provisional application No. 63/346,521, filed on May 27, 2022.

(51) Int. Cl.

| | |
|---|---|
| *F16B 21/16* | (2006.01) |
| *A01K 97/10* | (2006.01) |
| *B63B 21/00* | (2006.01) |
| *B63B 21/04* | (2006.01) |
| *B63B 34/26* | (2020.01) |
| *F16B 2/16* | (2006.01) |
| *F16B 2/18* | (2006.01) |

(52) U.S. Cl.  
CPC ............ *F16B 21/165* (2013.01); *B63B 21/04* (2013.01); *B63B 34/26* (2020.02); *F16B 2/16* (2013.01); *F16B 2/18* (2013.01); *A01K 97/10*

(2013.01); *B63B 2021/004* (2013.01); *Y10S 403/04* (2013.01); *Y10S 403/06* (2013.01); *Y10T 403/592* (2015.01)

(58) Field of Classification Search  
CPC ........ A01K 97/10; B63B 21/60; B63B 34/26; B63B 2017/0054; B63B 2021/004; F16B 2/16; F16B 2/18; F16B 2/185; F16B 7/042; F16B 21/165; Y10S 403/04; Y10S 403/06; Y10T 403/592; Y10T 403/595  
USPC ................. 403/322.2, 322.4, DIG. 4, DIG. 6  
See application file for complete search history.

(56) References Cited

U.S. PATENT DOCUMENTS

| | | | | |
|---|---|---|---|---|
| 2,816,471 A | * | 12/1957 | Bachman | .............. F16B 21/165 |
| | | | | 24/453 |
| 4,071,271 A | * | 1/1978 | Bourrie | ............... E05B 47/0002 |
| | | | | 292/201 |
| 4,120,232 A | * | 10/1978 | Hoffman, Jr. | ............ B64D 1/06 |
| | | | | 403/316 |

(Continued)

FOREIGN PATENT DOCUMENTS

| | | | | | |
|---|---|---|---|---|---|
| AT | | 203807 B | * | 6/1959 | ............ F16B 21/165 |
| AT | | 10776 U1 | * | 10/2009 | ............... F16B 2/16 |

(Continued)

*Primary Examiner* — Josh Skroupa  
(74) *Attorney, Agent, or Firm* — Dority & Manning, P.A.

(57) ABSTRACT

Apparatus and corresponding and/or associated methodology for a surface mounted base/pin system that allows a user to release an accessory by actuating the pin system which releases the unit from the base. The subject base/pin system uses a plurality of grooves in a base component and a plurality of balls in a pin component for providing rotational locking positions.

21 Claims, 39 Drawing Sheets

(56)                    References Cited

U.S. PATENT DOCUMENTS

| | | | | |
|---|---|---|---|---|
| 4,716,674 | A * | 1/1988 | Kammeraad | A01K 91/08 |
| | | | | 403/227 |
| 5,027,630 | A * | 7/1991 | Stillwagon | F16B 2/16 |
| | | | | 70/391 |
| 7,013,766 | B2 * | 3/2006 | Lee | B25B 23/0021 |
| | | | | 403/325 |
| 7,121,951 | B2 * | 10/2006 | Chang | F16D 3/20 |
| | | | | 403/322.2 |
| 7,641,415 | B2 * | 1/2010 | Fox | A01B 71/06 |
| | | | | 403/322.2 |
| 8,821,061 | B2 * | 9/2014 | Baus | F16B 2/16 |
| | | | | 403/322.2 |
| 9,242,422 | B2 * | 1/2016 | Schweizer | B25B 23/0035 |
| 9,441,424 | B2 * | 9/2016 | Beesley | E21B 43/0107 |
| 10,451,102 | B2 * | 10/2019 | Anderes | F16B 35/06 |
| 10,883,571 | B2 * | 1/2021 | Jackson | F16G 11/108 |
| 10,919,132 | B2 * | 2/2021 | Huang | B25B 23/0028 |
| 2002/0021005 | A1 * | 2/2002 | Giovanni | F16B 21/165 |
| | | | | 215/294 |
| 2012/0051835 | A1 * | 3/2012 | Taylor | F16B 21/165 |
| | | | | 403/322.2 |
| 2023/0240793 | A1 * | 8/2023 | Soto | A61B 34/30 |
| | | | | 211/85.13 |
| 2025/0339995 | A1 * | 11/2025 | Navarra Pruna | B29C 33/428 |

FOREIGN PATENT DOCUMENTS

| | | | | |
|---|---|---|---|---|
| GB | 717056 | A * | 10/1954 | F16B 21/165 |
| GB | 909247 | A * | 10/1962 | F16B 21/165 |

* cited by examiner

20

ADDITIONAL VERTICAL
GROOVES TO INCREASE TWIST
& PULLOUT STRENGTH

26

REMOVABLE RAIL MOUNTED KAYAK/SUP RACK

QUICK RELEASE PIN MARINE MOUNT SYSTEM FOR QUICK RELEASE ACCESSORIES

PRIORITY CLAIM

This application claims the benefit of previously filed U.S. Provisional patent application entitled "QUICK RELEASE PIN MARINE MOUNT SYSTEM FOR ROD HOLDERS AND ACCESSORIES," designated U.S. Ser. No. 63/346, 521, filed May 27, 2022, and which is incorporated herein by reference for all purposes.

FIELD OF THE SUBJECT MATTER

The presently disclosed subject matter relates to the marine environment. More particularly, the presently disclosed subject matter relates to apparatus and corresponding and/or associated methodology for integration of an improved surface mount system for a rod holder or other marine accessories associated with a boat or similar setting.

BACKGROUND OF THE SUBJECT MATTER

In certain applications it is desirable to use a holder for a fishing rod Or other marine-associated accessories (such as bumper cleats, tie-down cleats, down-rigging systems or others). Fishing rod holders are widely used by both commercial operators and hobbyists. One form of use is during trolling (which involves fishing by trailing a baited line along behind a boat). Rod holders allow the boater to troll several rods at different angles (such as resulting in different depths) at the same time without have to hold each rod.

Under certain circumstances, even though conveniently held without requiring attention or assistance of the user, a fishing rod can nonetheless be positioned or situated in a way that is less than ideal for operations.

In addition, existing rod holders can have inadequate strength to serve as mounting platforms for other more heavy-duty requirements for potentially supporting other marine-associated accessories.

While various implementations of fishing rod holders and marine mounts have been developed, no design has emerged that generally encompasses all of the desired characteristics as hereafter presented in accordance with the presently disclosed technology.

SUMMARY OF THE SUBJECT MATTER

In view of the recognized features encountered in the prior art and addressed by the presently disclosed subject matter, improved apparatus and corresponding methodology therefor have been provided for improved interchangeable fishing rod holders and accessory marine mounts. More particularly, the presently disclosed subject matter relates to the integration of an improved surface mounted base and pin system that allows a user (boater/fisherman) to quickly relocate or remove the desired accessory/holder from one location to another by actuating the pin system which releases the unit from the base.

One presently disclosed exemplary embodiment relates to a surface mounted base/pin system that allows a user (boater/fisherman) to quickly relocate or remove the desired accessory from one location to another by actuating the pin system for release from a base, using a plurality of grooves in a base component and a plurality of balls in a pin component for strengthening the unit and for providing rotational locking positions as desired.

Some presently disclosed exemplary embodiments relate to a surface mounted base/pin system that utilize a pin housing system using a various number (such as 1 to 4) of rows of balls that mounts into a base unit with 1 or 2 spherical and a number of (such as 8) vertical grooves that lock the pin component in-place when the pin is released.

It is also a present object to provide technology which is equally usable by OEM's, commercial users, and hobbyists alike.

One exemplary embodiment of presently disclosed subject matters relates to a quick release mounting system for interchangeable marine accessories for use on a supporting railing area of a water craft. Such system preferably may comprise a receiving base configured for being mounted along a supporting railing area of an associated water craft, with at least a portion of the base depending below the upper surface of the railing area, the base defining at least one longitudinal groove along a portion of the length thereof, and defining an elongated recess adjacent the groove and configured for receiving an insert; a pin insert configured for selective insertion by a user into the base elongated recess, wherein the insert includes a contoured plunger axially movable within the recess, and at least one partially captured ball radially movable relative to the insert; and a pivoting toggle mounted on the insert for selectively moving the mounting system into a locked position whereby the at least one ball is forced radially outward by the contoured plunger into contact with the longitudinal groove, and for selectively moving the mounting system into an unlocked position whereby the at least one ball is freed by the contoured plunger to move radially inward out of contact with the longitudinal groove.

Another example of a presently disclosed embodiment may relate to a quick release base/pin mounting system that allows a user to quickly relocate or remove a selected interchangeable marine accessory from one location to another along a supporting railing area of a water craft by actuating the pin to release it from the base. Such system may comprise a receiving base configured for being flush mounted along a supporting railing area of an associated water craft, with the base depending below the upper surface of the railing area, the base defining a plurality of longitudinal grooves along a portion of the length thereof, and defining an elongated recess adjacent the groove and configured for receiving an insert; a pin insert configured for selective insertion by a user into the base elongated recess, wherein the insert includes a contoured plunger axially movable within the recess, and at least one partially captured ball for each respective longitudinal groove, and radially movable relative to the insert; a pivoting toggle mounted on the insert for selectively moving the mounting system into a locked position whereby the at least one ball is forced radially outward by the contoured plunger into contact with the longitudinal groove, and for selectively moving the mounting system into an unlocked position whereby the at least one ball is freed by the contoured plunger to move radially inward out of contact with the longitudinal groove; and at least one of an annular stop or a peripheral spherical groove for interaction with the balls for capturing the insert from being withdrawn whenever the mounting system is selectively moved into its locked position.

The presently disclosed subject matter relates both to apparatus and corresponding and/or associated methodology.

One exemplary embodiment of presently disclosed methodology relates to methodology for a quick release mounting system for using interchangeable marine accessories on a supporting railing area of a water craft. Such methodology preferably comprises mounting a receiving base along a supporting railing area of an associated water craft, with at least a portion of the base depending below the upper surface of the railing area, the base defining at least one longitudinal groove along a portion of the length thereof, and defining an elongated recess adjacent the groove and configured for receiving an insert; and selectively inserting a pin insert into the base elongated recess, wherein the insert includes a contoured plunger axially movable within the recess, and at least one partially captured ball radially movable relative to the insert, and with a pivoting toggle mounted on the insert for selectively moving the mounting system into a locked position whereby the at least one ball is forced radially outward by the contoured plunger into contact with the longitudinal groove, and for selectively moving the mounting system into an unlocked position whereby the at least one ball is freed by the contoured plunger to move radially inward out of contact with the longitudinal groove.

Additional objects and advantages of the presently disclosed subject matter are set forth in, or will be apparent to those of ordinary skill in the art from, the detailed description herein. Also, it should be further appreciated that modifications and variations to the specifically illustrated, referenced, and discussed features, elements, and steps hereof may be practiced in various embodiments and uses of the presently disclosed subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the presently disclosed subject matter, including the best mode thereof, directed to one of ordinary skill in the art, is set forth in the specification, which makes reference to the appended figures, in which.

Figure 1A:
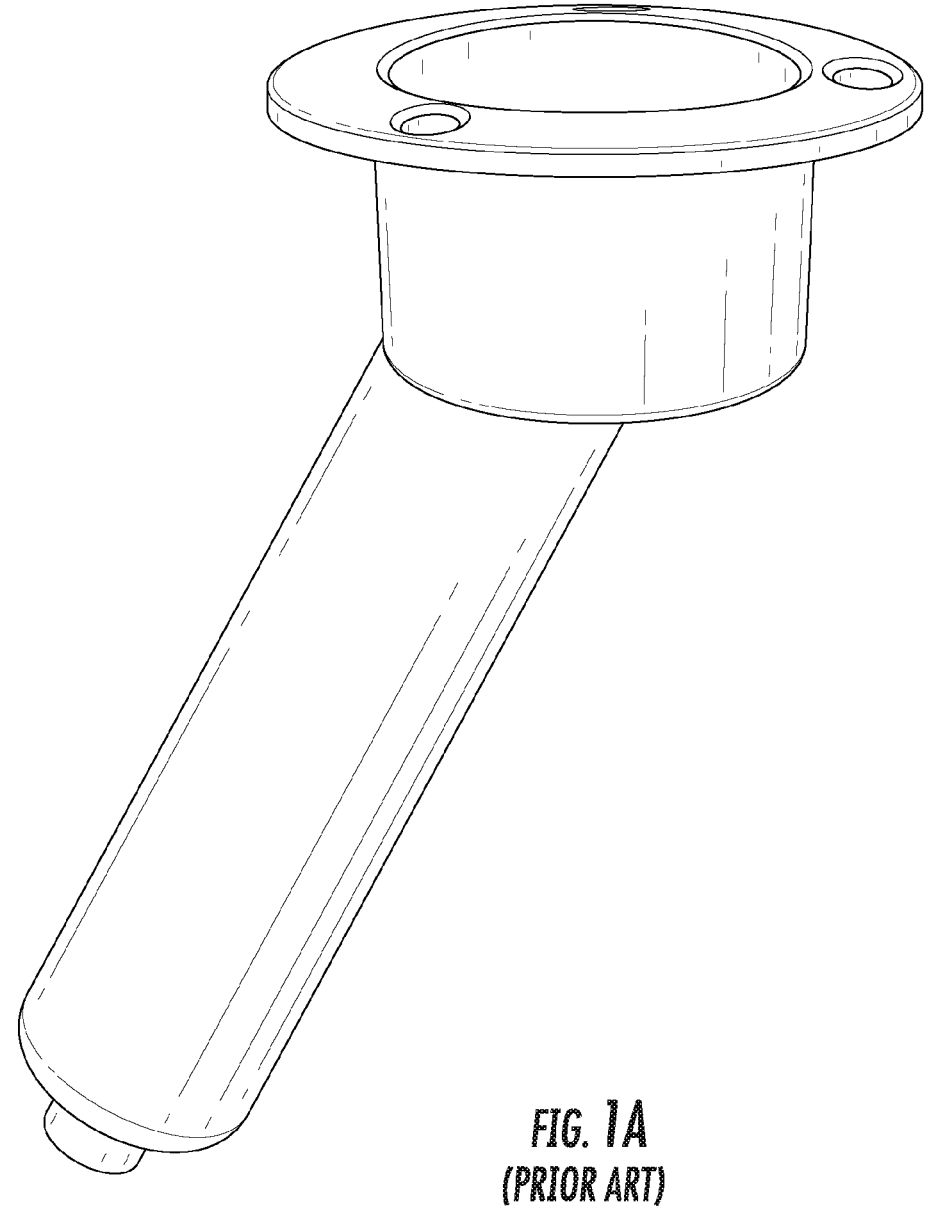
FIGS. 1A through 1C illustrate respectively perspective generally side views of Prior Art devices for holding cups and/or rods.

Repeat use of reference characters throughout the present specification and appended drawings is intended to represent same or analogous features, elements, or steps of the presently disclosed subject matter.

DETAILED DESCRIPTION OF THE PREFERRED EMBODIMENTS

As discussed in the Summary of the Subject Matter section, the presently disclosed subject matter is generally concerned with apparatus and methodologies in the marine environment. More particularly, the presently disclosed subject matter relates to apparatus and corresponding and/or associated methodology for a surface mounted base/pin system that allows a user (boater/fisherman) to quickly relocate or remove the desired accessory from one location to another.

Selected combinations of aspects of the presently disclosed technology correspond to a plurality of different embodiments of the presently disclosed subject matter. It should be noted that each of the exemplary embodiments presented and discussed herein should not insinuate limitations of the presently disclosed subject matter. Features or steps illustrated or described as part of one embodiment may be used in combination with aspects of one or more other embodiments to yield yet further embodiments. Additionally, certain features may be interchanged with similar devices or features not expressly mentioned which perform the same or similar function or functions.

Reference will now be made in detail to the presently preferred exemplary embodiments of the subject apparatus and methodology.

One attribute of certain exemplary embodiments of the presently disclosed subject matter is the ability in one unlocking movement, to easily rotate 360° and/or to simultaneously pivot from 0° to some angle such as 45° to provide optimal positioning. Furthermore, such unlocking/locking mechanism as presently disclosed can be activated (actuated) while trolling. Cleats provide a mooring point for the user to secure the boat to a dock or other structure. Current boat cleats are in a fixed orientation on the boat. The presently disclosed subject matter allows the cleat to be rotated 360 degrees in 45 degrees increments towards the direction of the line load, that provides locking at a specific angle if desired. It also allows the user to easily remove it from one location and place it another.

Another attribute of certain exemplary embodiments of the presently disclosed subject matter is the ability to provide a strengthened, locked system which also is more heavy-duty for supporting additional accessories.

Still another attribute of the Quick Release Base is the ability to quickly remove the Rod Holder/Cleat/Other accessory from one (1) Base component to another Base component located at a different location on the boat. This is accomplished by utilizing Pin housing system using 1 to 4 rows of balls that mounts into a base unit with 1 or 2 spherical and a number (such as 8) of vertical grooves that locks the Pin component in-place when the Pin is released.

Figure 1B:
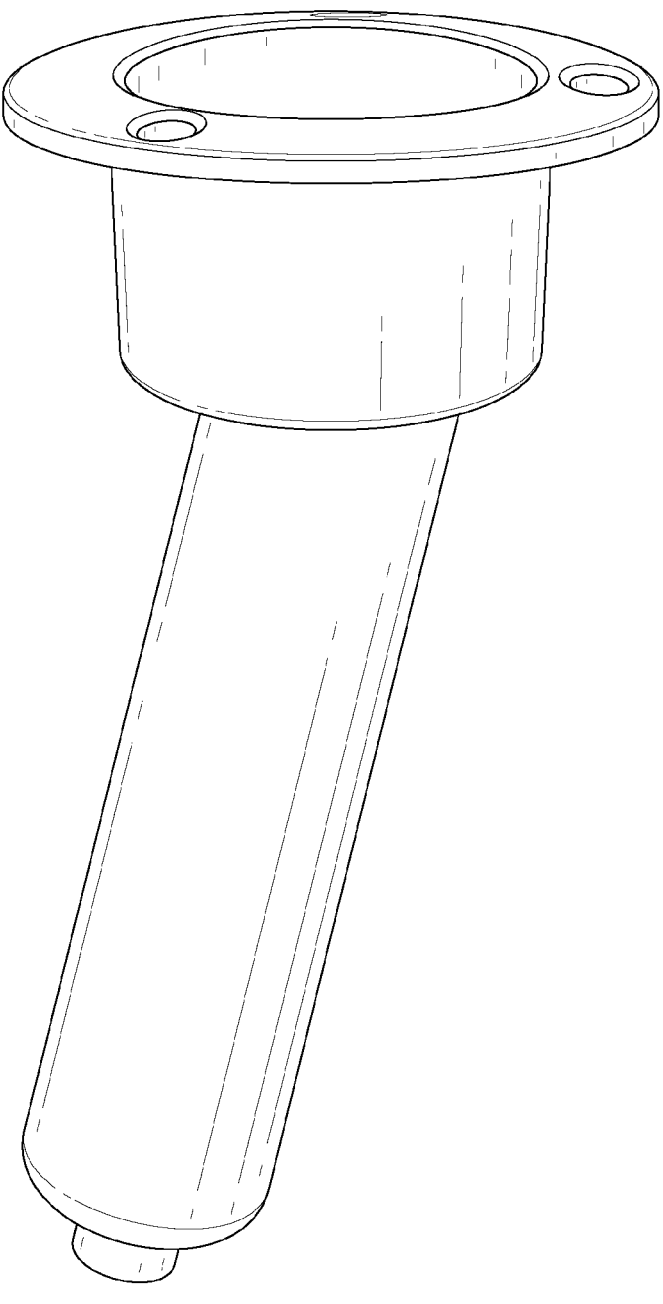
Figure 1C:
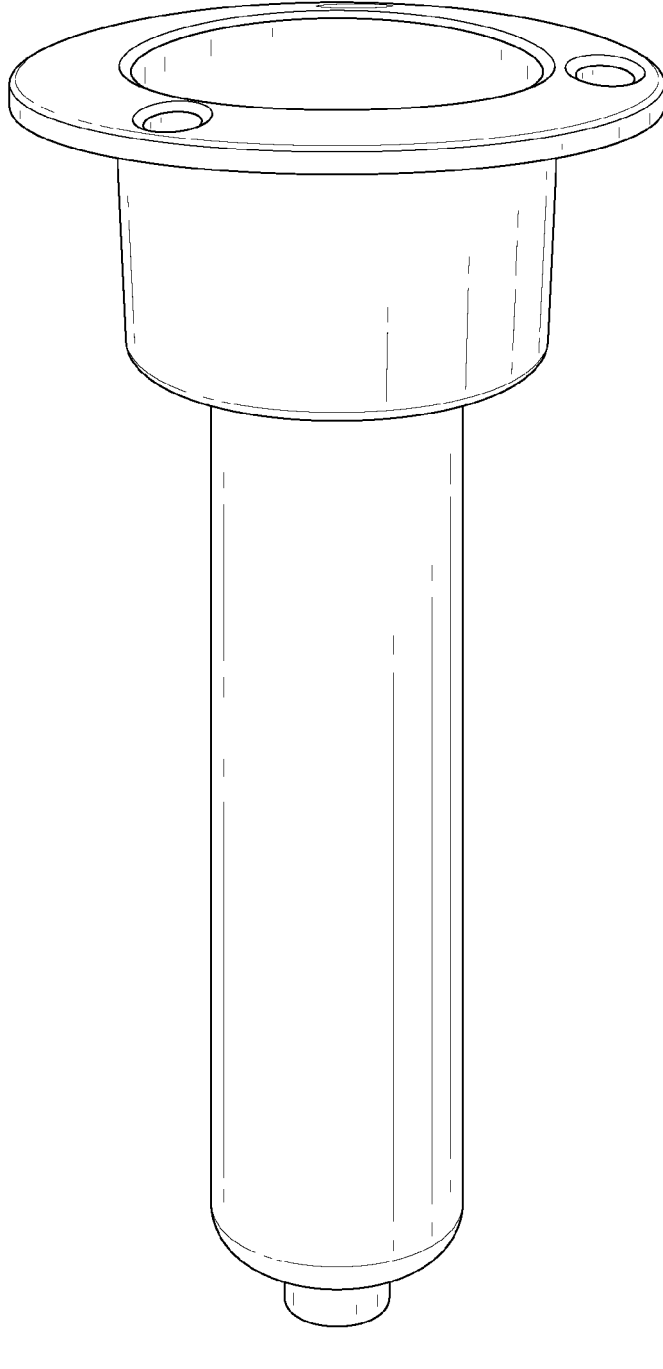

FIGS. 1A through 1C illustrate respectively perspective generally side views of Prior Art devices for holding cups and/or rods. As will be understood by those of ordinary skill in the art, such cup and rod holder combination devices are fixed into position once mounted or placed. In other words, a user cannot adjust the support once the unit is mounted.

Figure 2A:
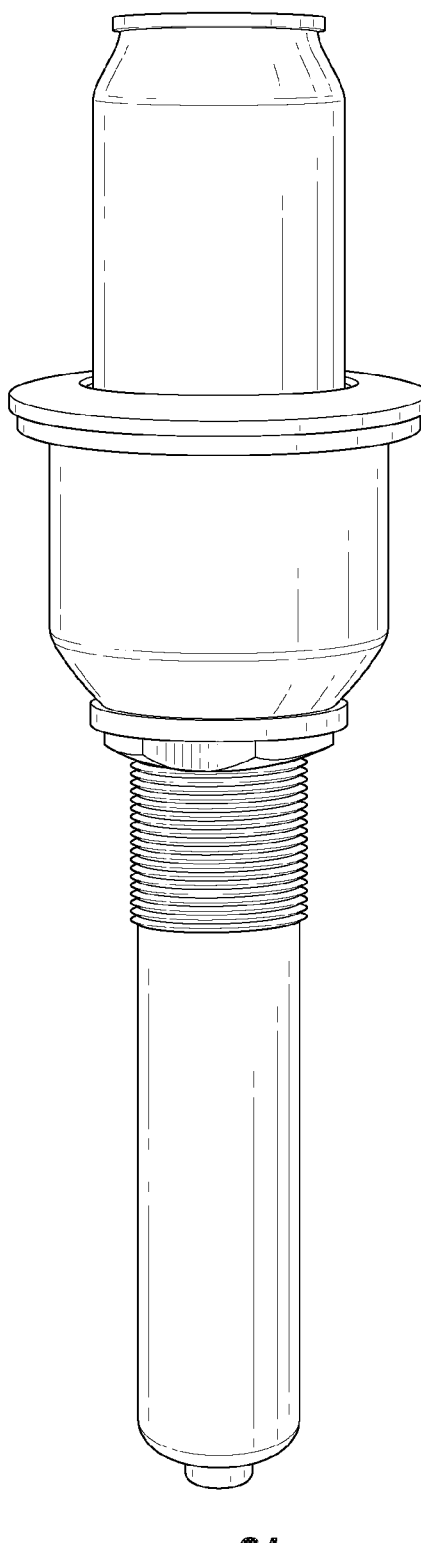
FIGS. 2A through 2C illustrate respectively perspective generally side and/or partially top views of Prior Art devices for holding cups and/or rods.
Figure 2B:
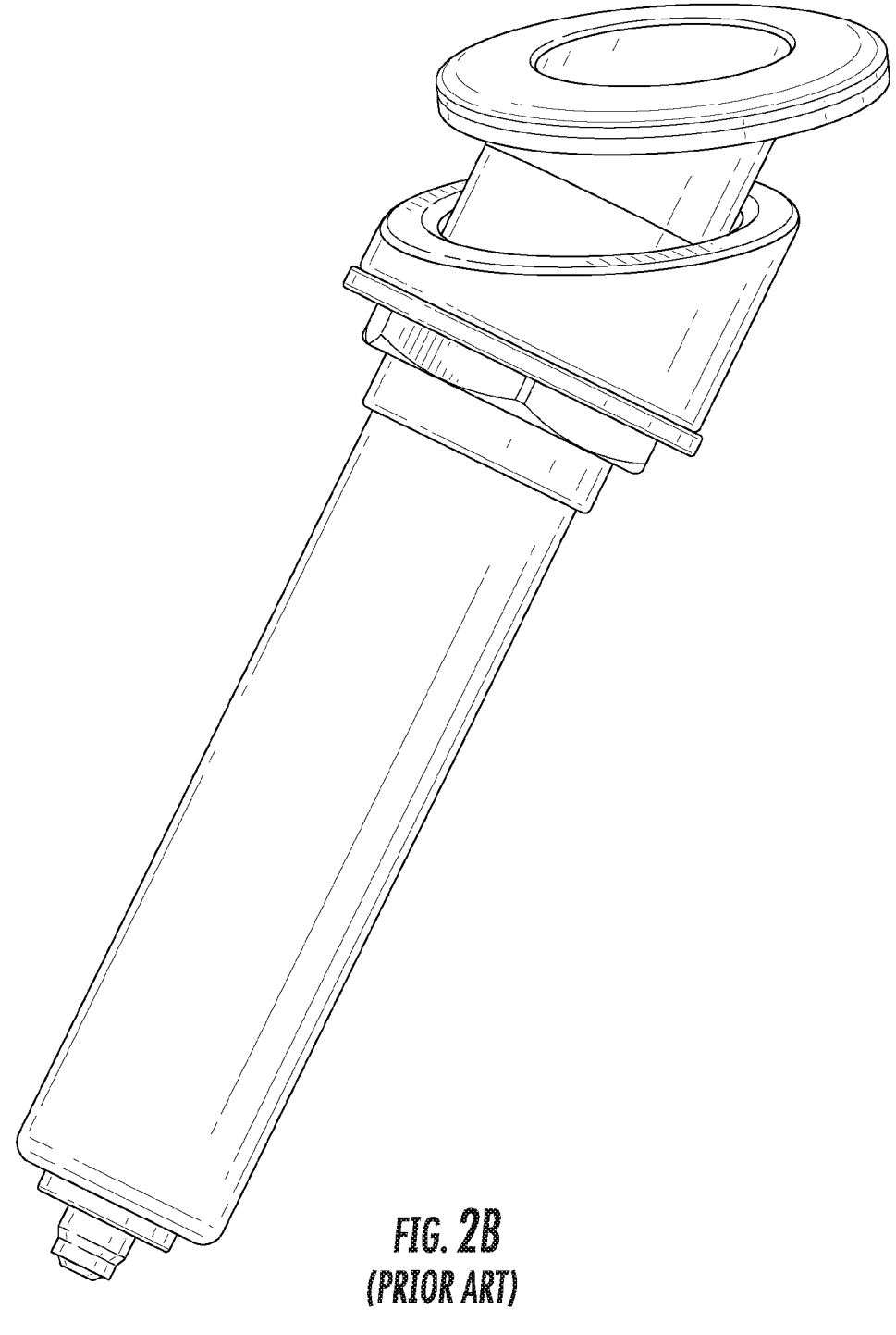
Figure 2C:
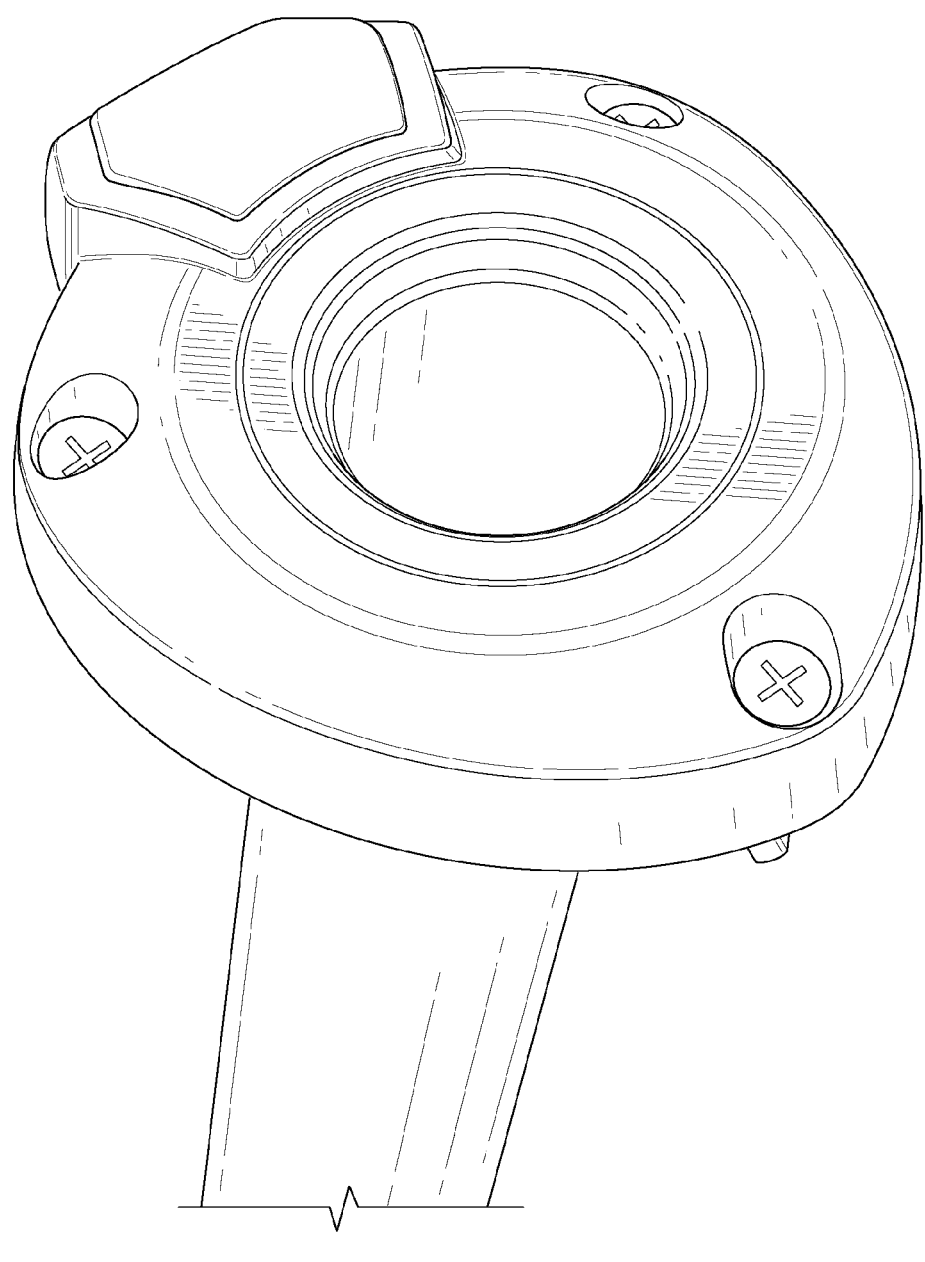

FIGS. 2A through 2C illustrate respectively perspective generally side and/or partially top views of Prior Art devices for holding cups and/or rods. As will be understood by those of ordinary skill in the art, the device at least of FIG. 2C allows for the device to be in part rotated once the device is installed.

Figure 3A:
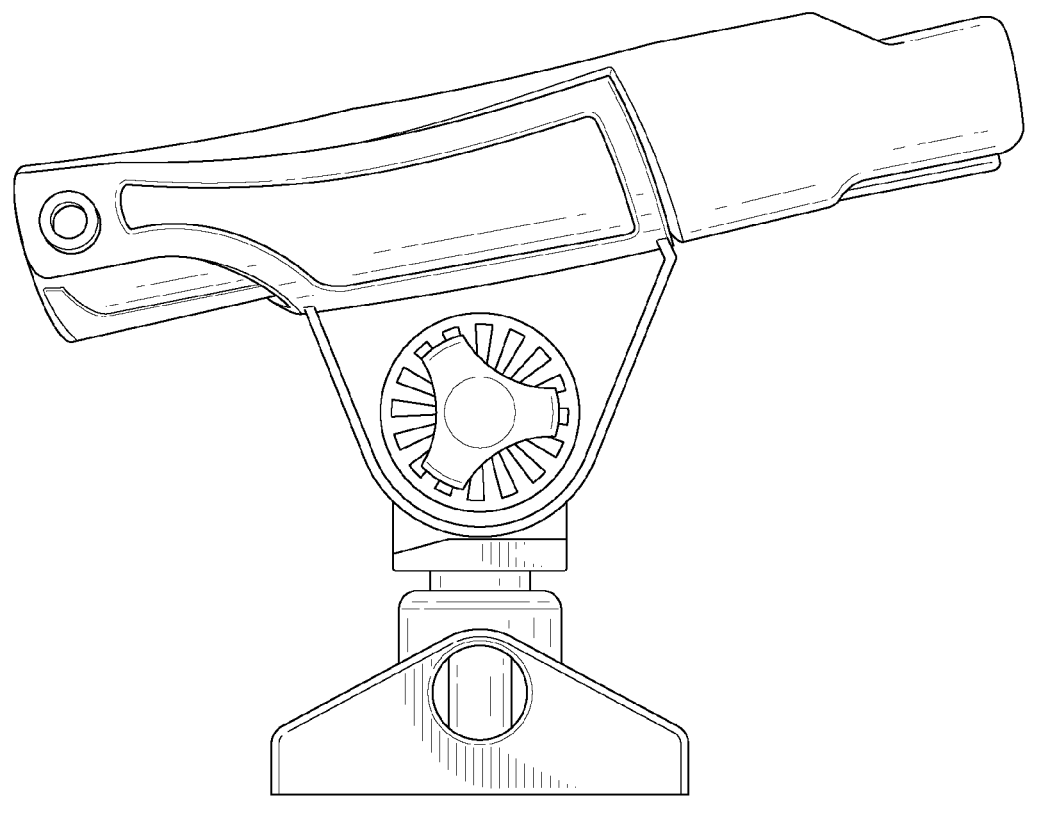
FIGS. 3A and 3B illustrate respectively perspective generally side views of Prior Art devices for holding rods.
Figure 3B:
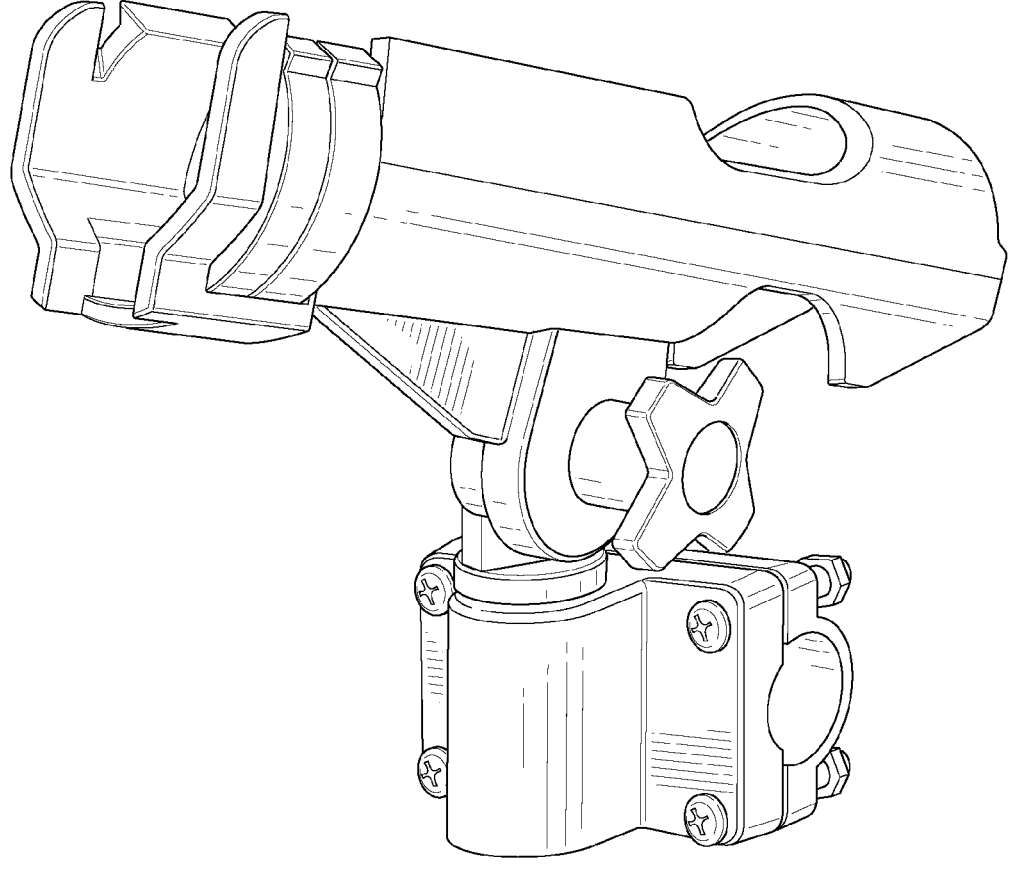

FIGS. 3A and 3B illustrate respectively perspective generally side views of Prior Art devices for holding rods. The illustrated devices of such figures allows for adjustments, while only allowing for one movement at a time. FIGS. 3A and 3B illustrate devices that are capable of respective movements of either rotating or pivoting, but associated locking mechanisms for each movement are separate from each other, so that multiple adjustment mechanisms must be included in order to make plural forms of adjustment.

Figure 4A:
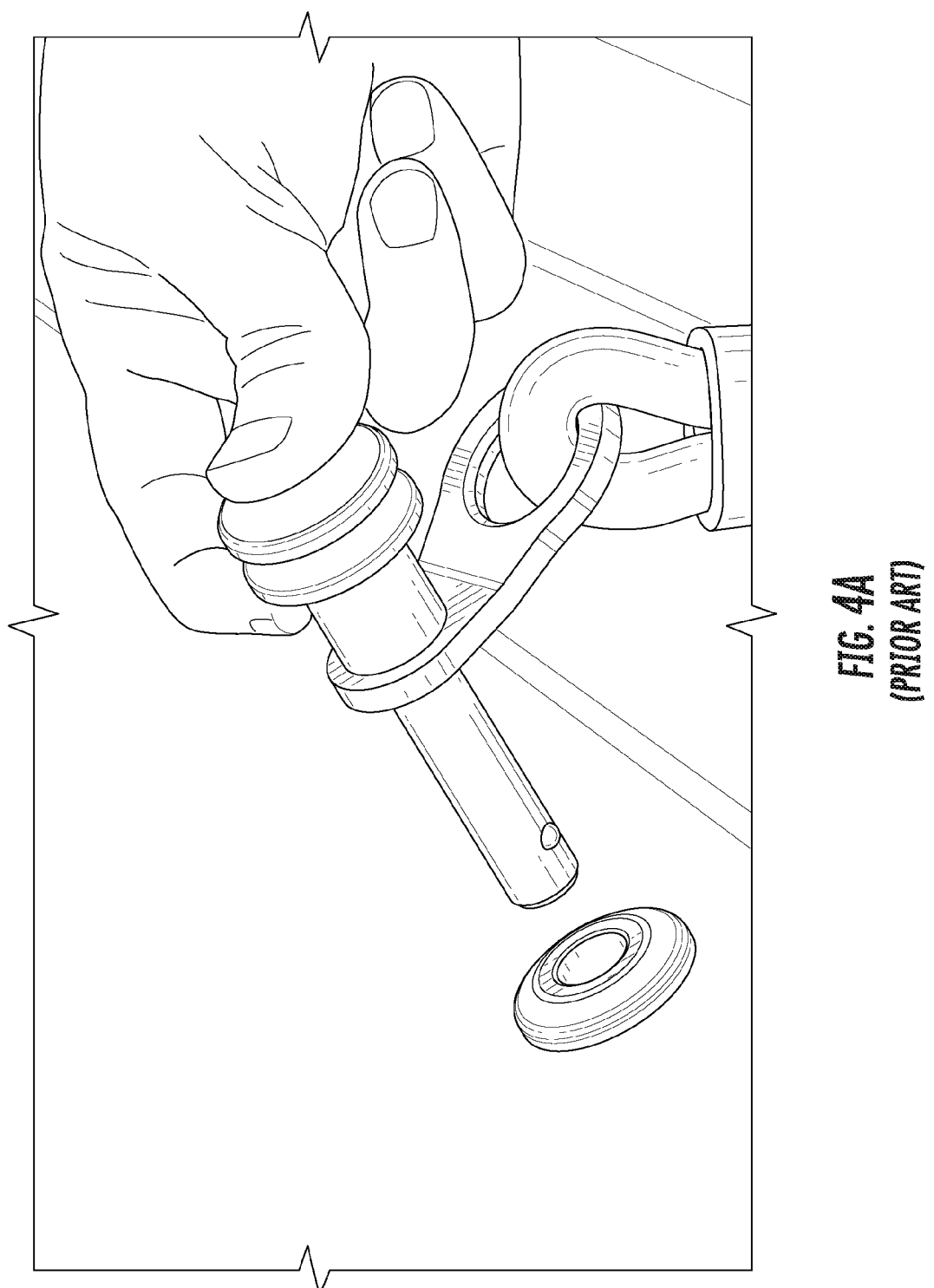
FIGS. 4A and 4B illustrate generally perspective side views of exemplary embodiments of Prior Art removable devices for bumper and/or tie-down cleats.
Figure 4B:
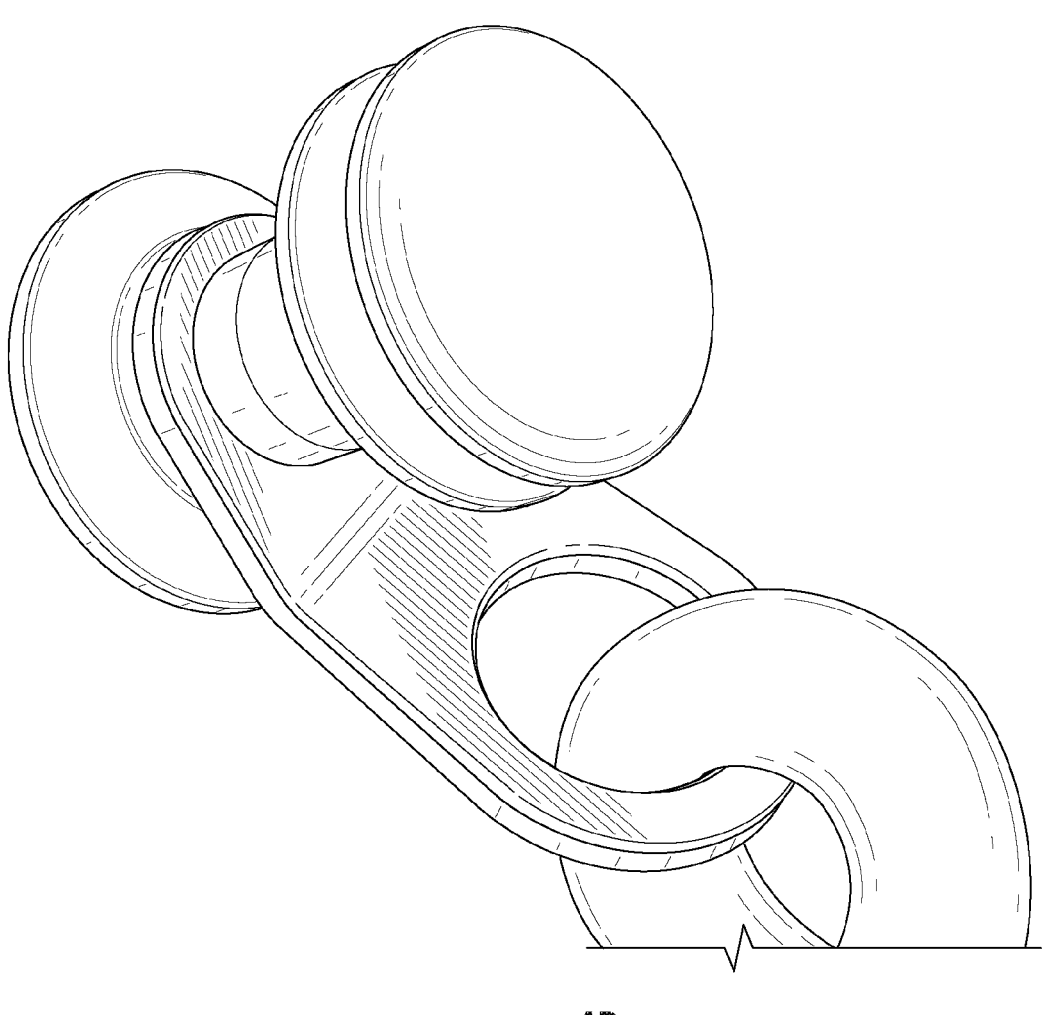
Figure 5A:
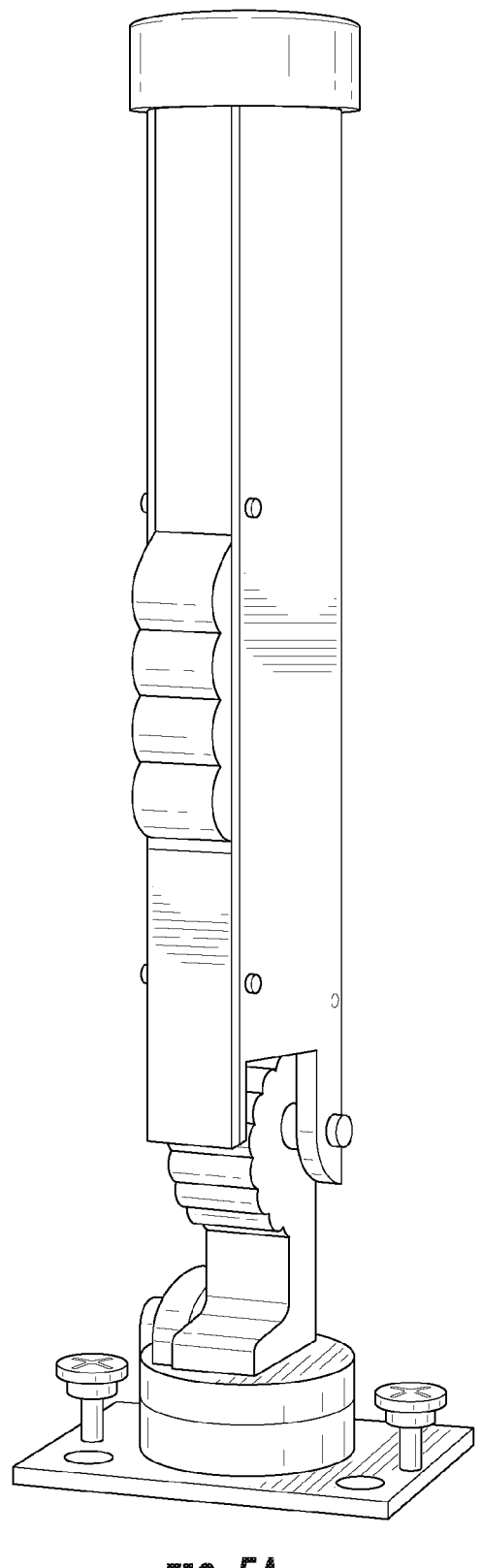
FIGS. 5A through 5D respectively illustrate examples of Prior Art rod holders (FIGS. 5A, 5B, and 5C) and a cleaning station (FIG. 5D) which may be mounted in a marine environment, such as a boat.
Figure 5B:
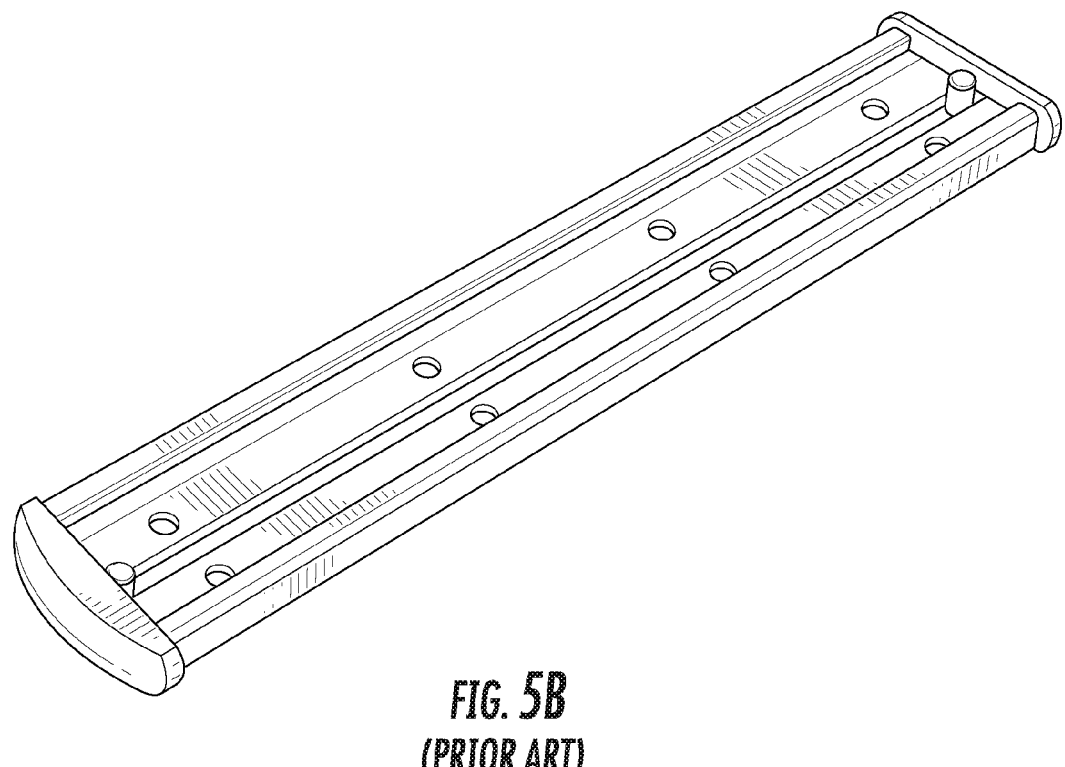
Figure 5C:
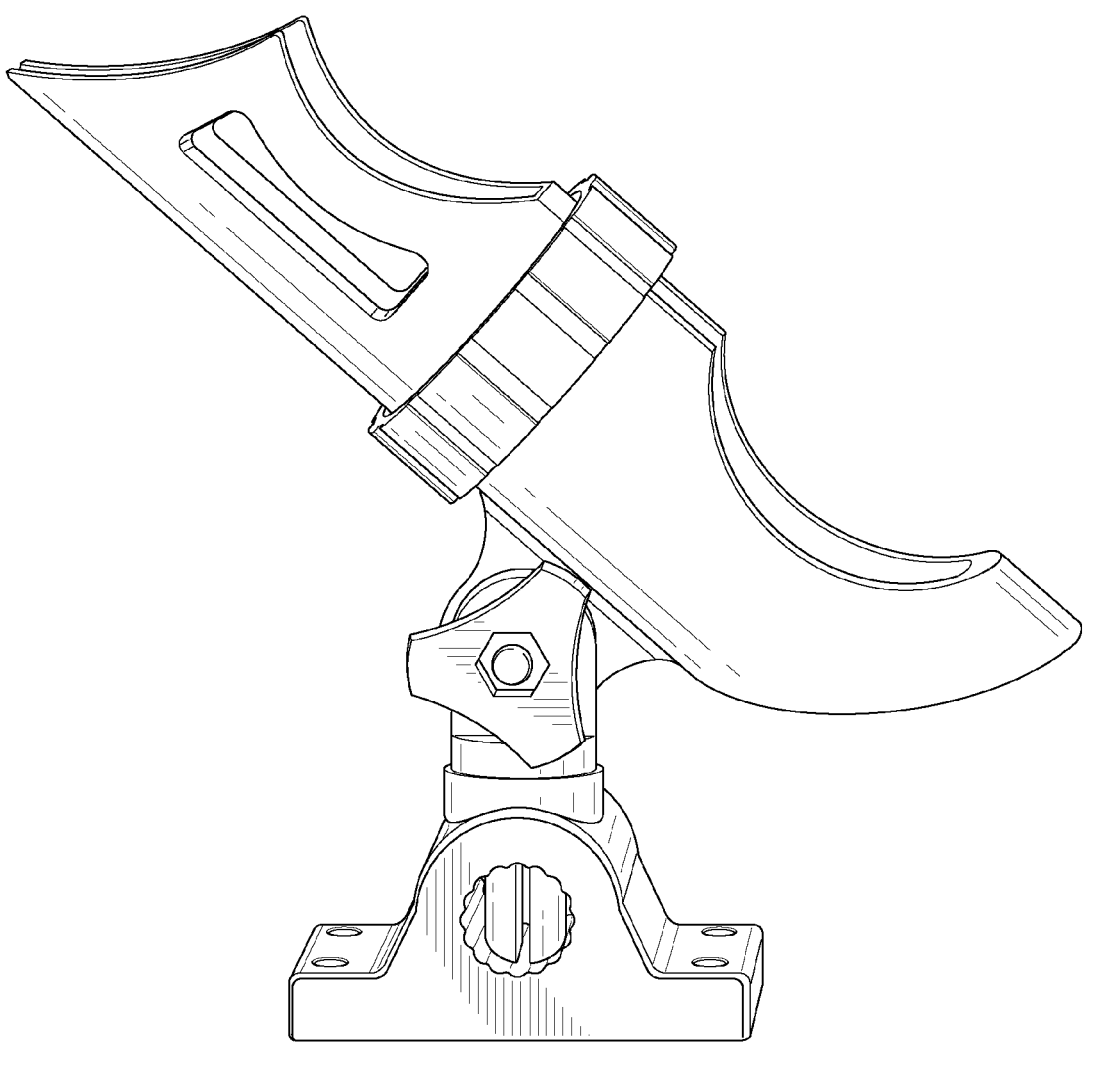
Figure 5D:
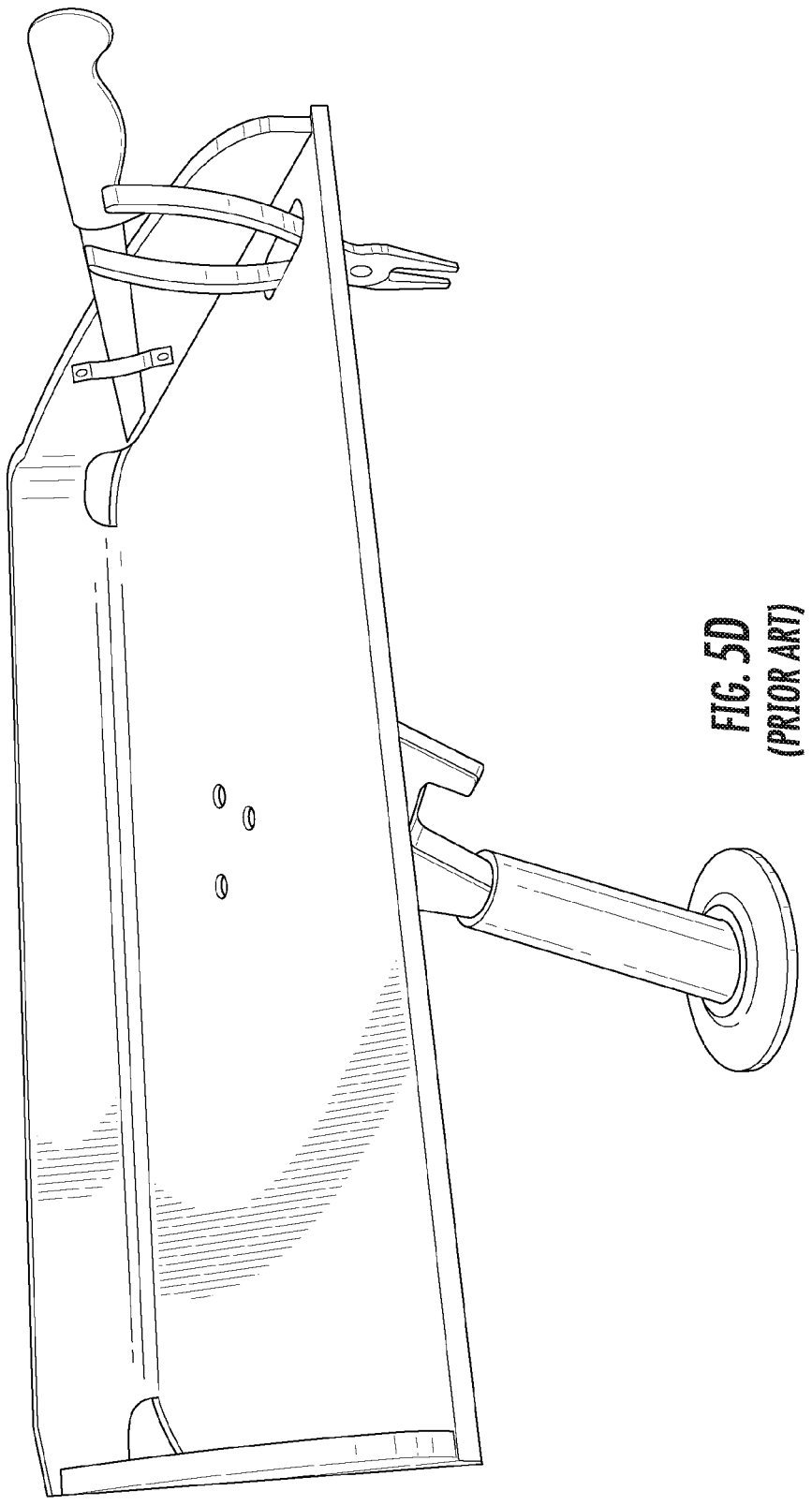

FIGS. 4A and 4B illustrate generally perspective side views of exemplary embodiments of Prior Art removable devices for bumper and/or tie-down cleats.

FIGS. 5A through 5D respectively illustrate examples of Prior Art rod holders (FIGS. 5A, 5B, and 5C) and a cleaning station (FIG. 5D) which may be mounted in a marine environment, such as on a boat.

Presently disclosed subject matter relates to fishing rod holders and marine accessories such as cleats and others, which are widely used by OEM's, commercial users, and hobbyists alike.

When trolling (fishing by trailing a baited line alongside or behind a boat), rod holders allow the boater to troll several rods in different angles at the same time without having to hold the rod. Cleats provide a mooring point for the user to secure the boat to a dock or other structure. Current boat cleats are in a fixed orientation on the boat. The presently disclosed subject matter allows the cleat to freely rotate 360 degrees in the direction of the line load, but also provides the ability to lock it in at a specific angle if desired. It also allows the user to easily remove it from one location and place it another.

One significant attribute of the quick release base is the ability to quickly remove the rod holder/cleat/other accessory from one (1) base component to another base component located at a different location on the boat. This is accomplished by utilizing Pin housing system using 1-4 rows of balls that mounts into a base unit with 1 to 2 spherical and 8 vertical grooves that locks the Pin component in-place when the Pin is released. While other embodiments may be practiced (including such as 3 or 4 rows, and 8 to 16 balls), such groove and ball embodiments provide improved strength of the locked system. These additional grooves will improve the pull-out strength of the unit and provide rotational locking positions every 45° if desired. It also provides a single (one) motion pin release/lock mechanism for release and rotational repositioning by the user. Overall, such system attributes provide the ability to utilize additional products (accessories) utilizing the strength of the locked (lockable) system. To further accommodate such heavy-duty requirements, the receiving base, the pin insert, and the balls may comprise reinforced materials.

Figure 6A:
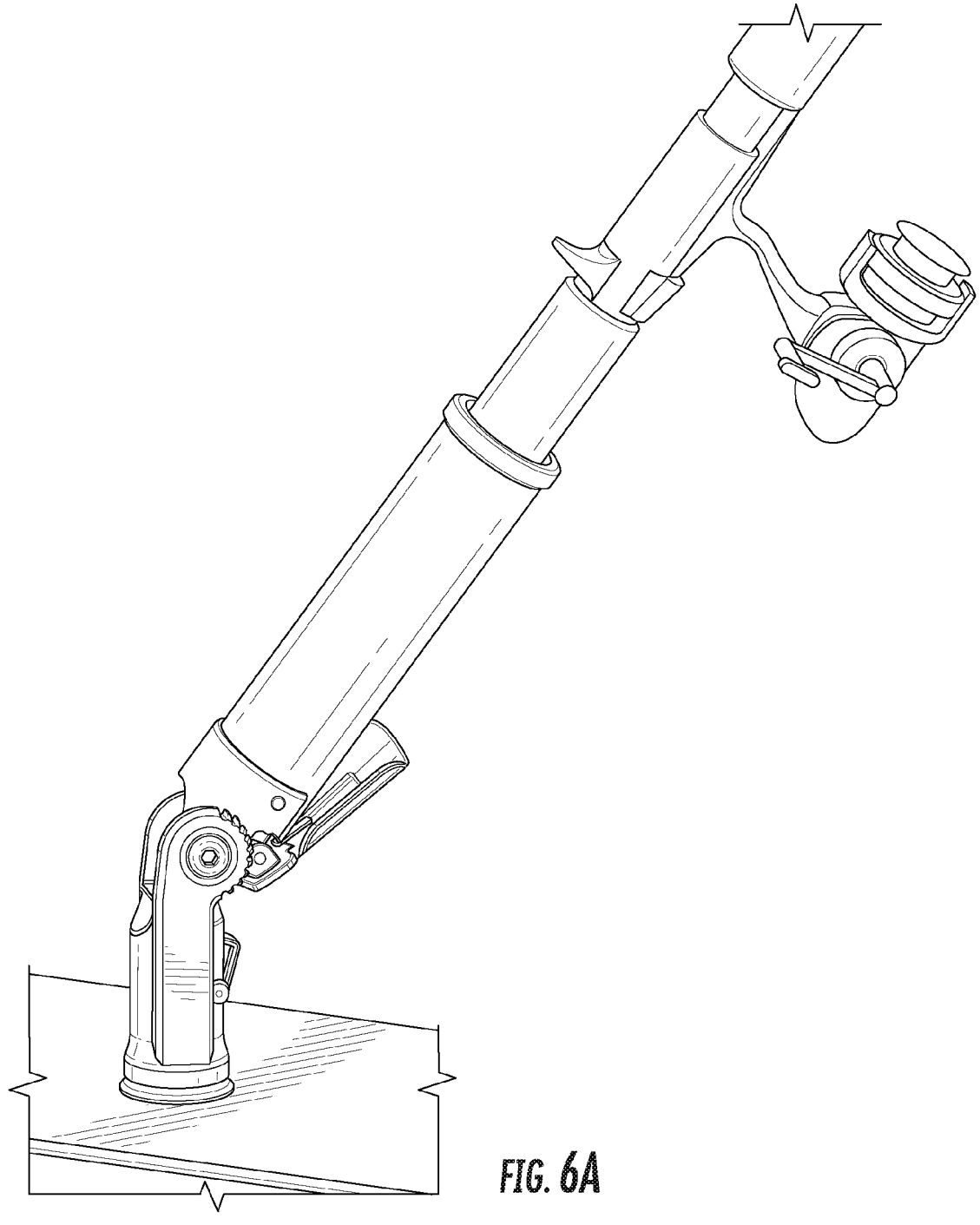
FIG. 6A illustrates a generally perspective view of an exemplary rod holder mounted in a marine environment in accordance with presently disclosed subject matter.

FIG. 6A illustrates a generally perspective view of an exemplary rod holder mounted in a marine environment in accordance with presently disclosed subject matter.

Figure 6B:
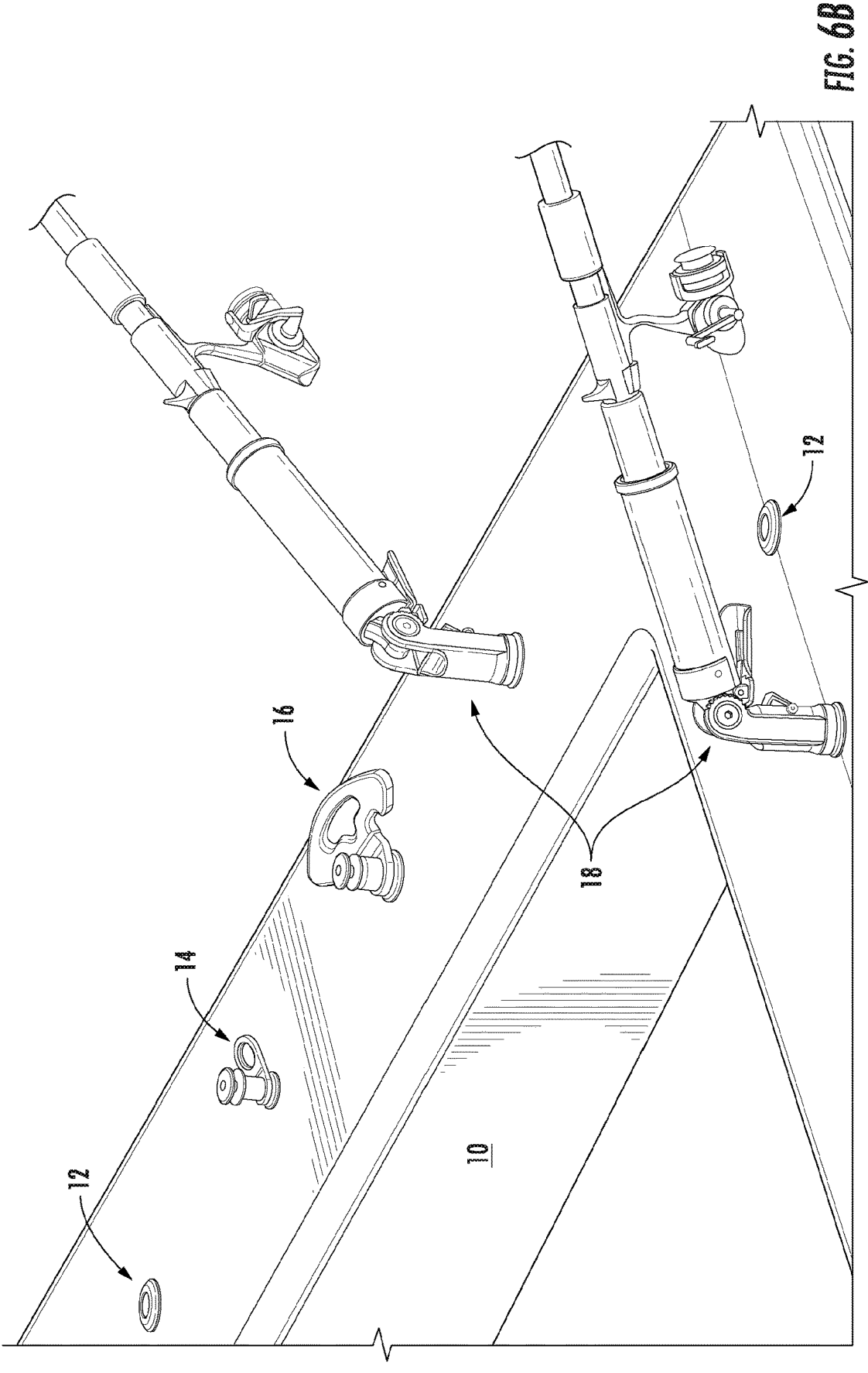
FIG. 6B illustrates generally perspective views of a plurality of presently disclosed bases mounted in a marine environment in accordance with presently disclosed subject matter, and with plural exemplary mounted items in a number of the illustrated bases.

FIG. 6B illustrates generally perspective views of a plurality of presently disclosed bases mounted in a marine environment in accordance with presently disclosed subject matter, and with plural exemplary mounted items in a number of the illustrated bases. For example, an associated supporting marine environment generally 10 may comprise a railing area around a boat. A presently disclosed exemplary embodiment of a base feature or members generally 12 may be flush mounted in such railing area 10. Exemplary presently-disclosed features are shown in the other illustrated elements of FIG. 6B, including a tie-down cleat generally 14, a representative bumper accessory generally 16, and rod holder examples generally 18.

Figure 7A:
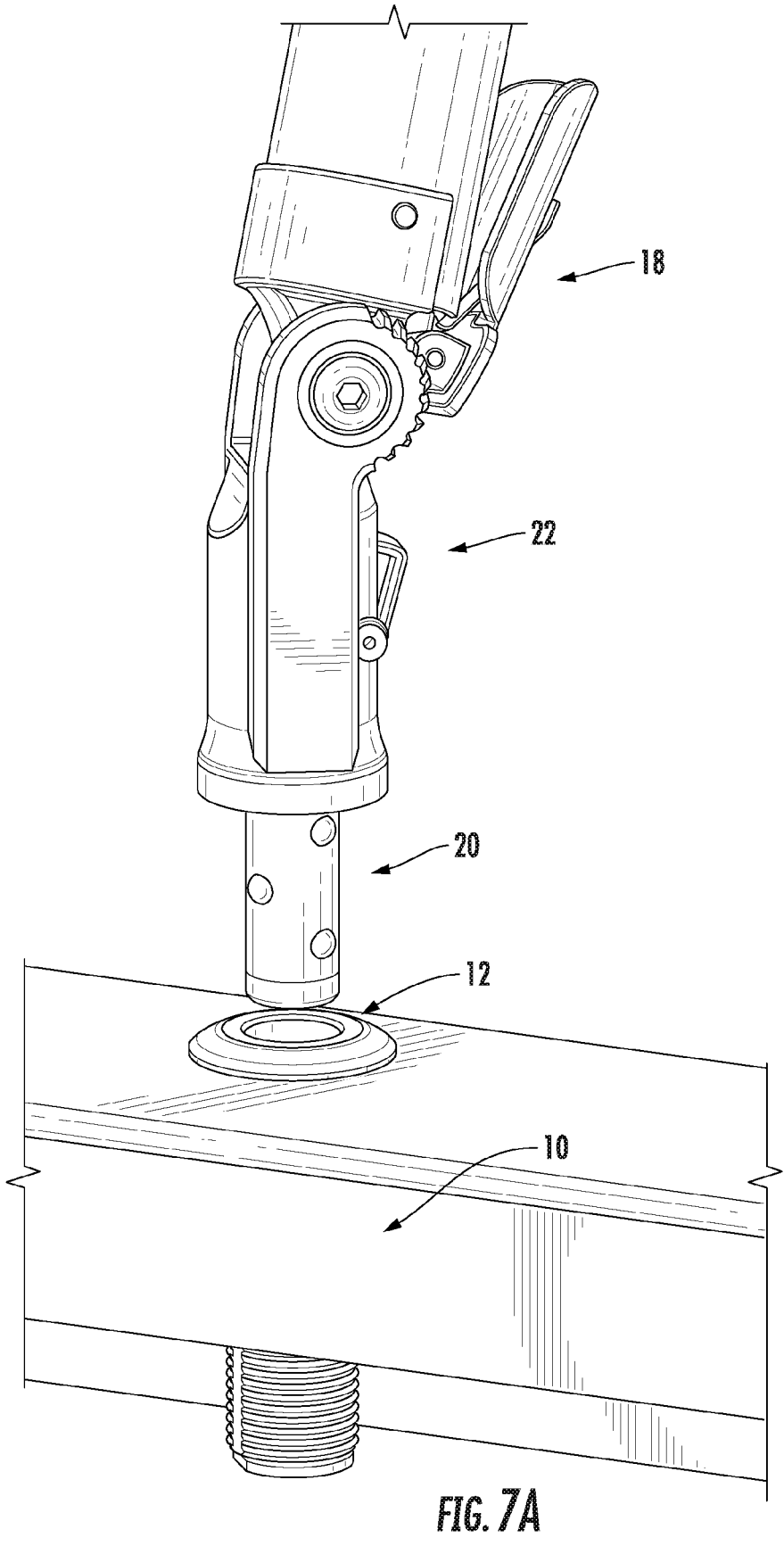
FIG. 7A illustrates a generally perspective view of exemplary presently disclosed subject matter, illustrating exemplary paired base and pin features thereof, and with illustration of an associated supporting marine environment shown to illustrate position of presently disclosed features relative to such marine environment.

FIG. 7A illustrates a generally perspective view of exemplary presently disclosed subject matter, illustrating exemplary paired base (generally 12) and pin (generally 20) features thereof, for supporting an example of a rod holder generally 18. Pin member 20 includes a movable toggle or actuation switch generally 22 which allows the pin feature to be freed (unlocked) for longitudinal and rotational movement relative to base generally 12.

Figure 7B:
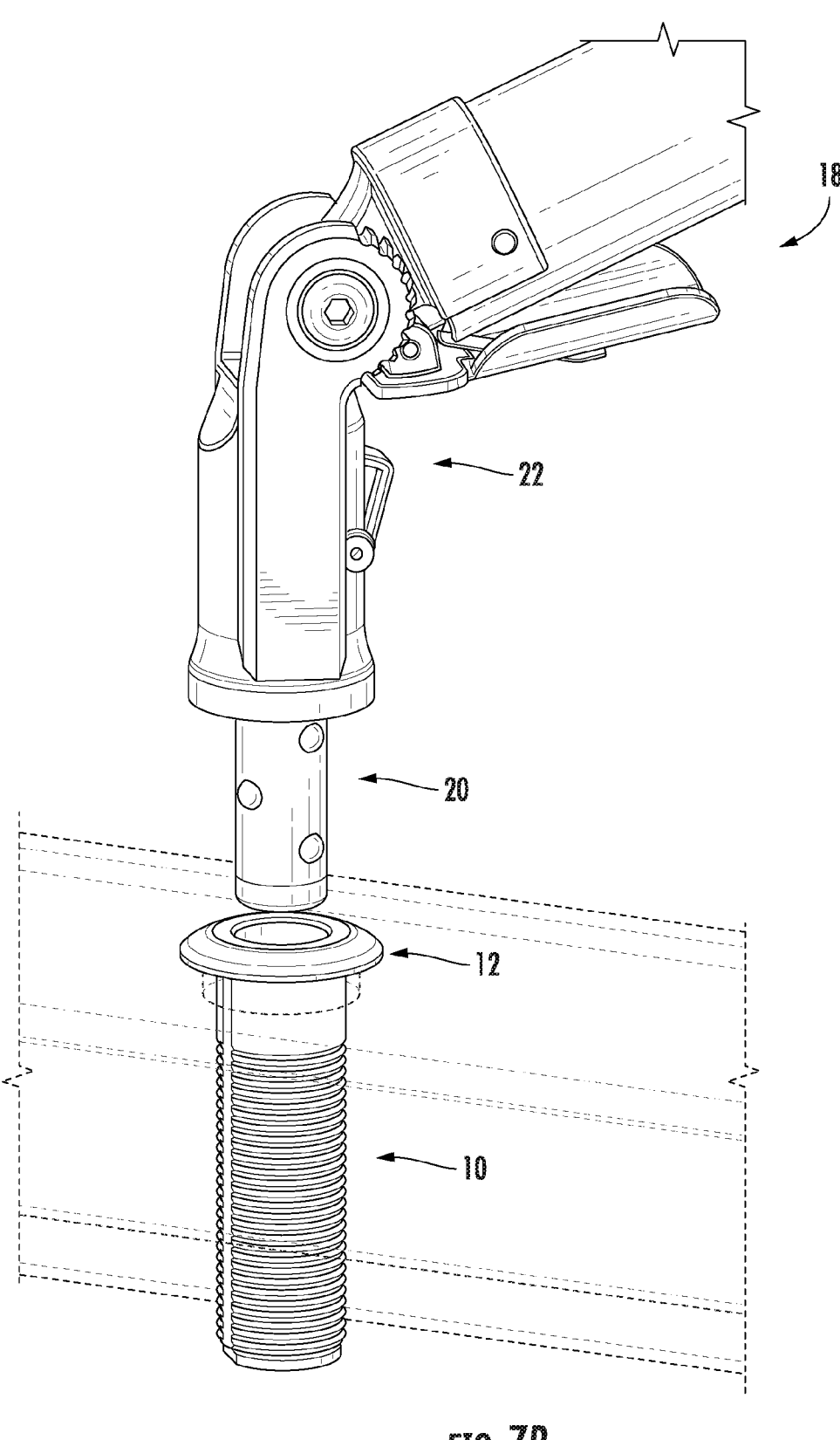
FIG. 7B illustrates a generally perspective view of exemplary presently disclosed subject matter, illustrating exemplary paired base and pin features thereof as in present FIG. 7A, and with illustration of an associated supporting marine environment shown in partial see-through to illustrate position of the presently disclosed base features relative to such marine environment.

FIG. 7B illustrates a generally perspective view of exemplary presently disclosed subject matter, illustrating exemplary paired base 12 and pin 20 features thereof as in present FIG. 7A, and with illustration of an associated supporting marine environment 10 shown in partial see-through to illustrate position of the presently disclosed base features relative to such marine environment.

Figure 7C:
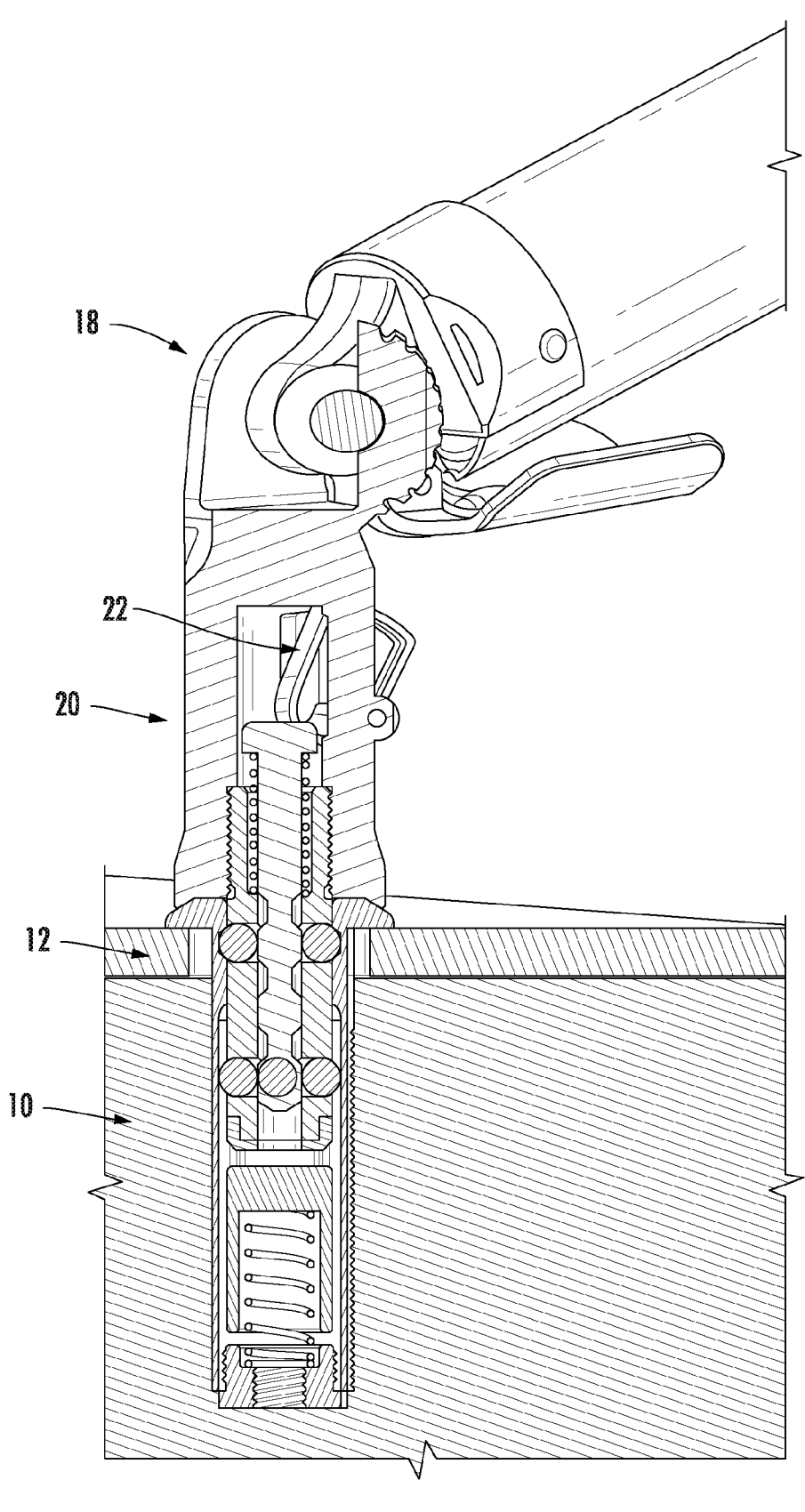
FIG. 7C illustrates a longitudinal sectional view of the base and pin exemplary subject matter of FIGS. 7A and 7B, with such exemplary base mounted in an associated marine environment and such exemplary pin features received in the exemplary base.

FIG. 7C illustrates a longitudinal sectional view of the base 12 and pin 20 exemplary subject matter of FIGS. 7A and 7B, with such exemplary base 12 mounted in an associated marine environment 10 and such exemplary pin features 20 received in the exemplary base 12. As shown, preferably base 12 is relatively flush-mounted relative to an upper supporting surface of support 10, and depending below such surface.

Figure 7D:
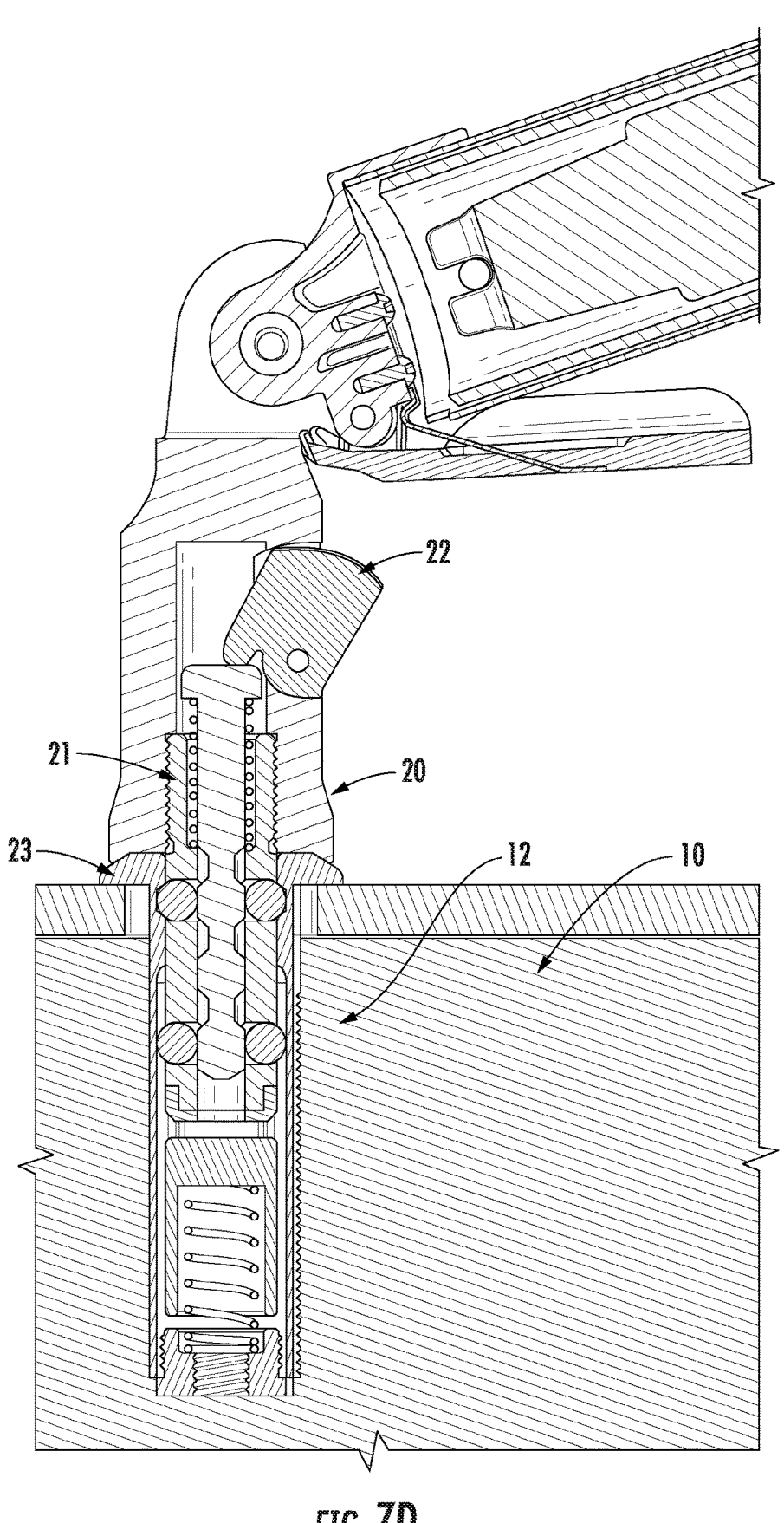
FIGS. 7D and 7E respectively illustrate, in longitudinal deeper sectional views, locked and unlocked conditions of the subject matter of present FIG. 7C.
Figure 7E:
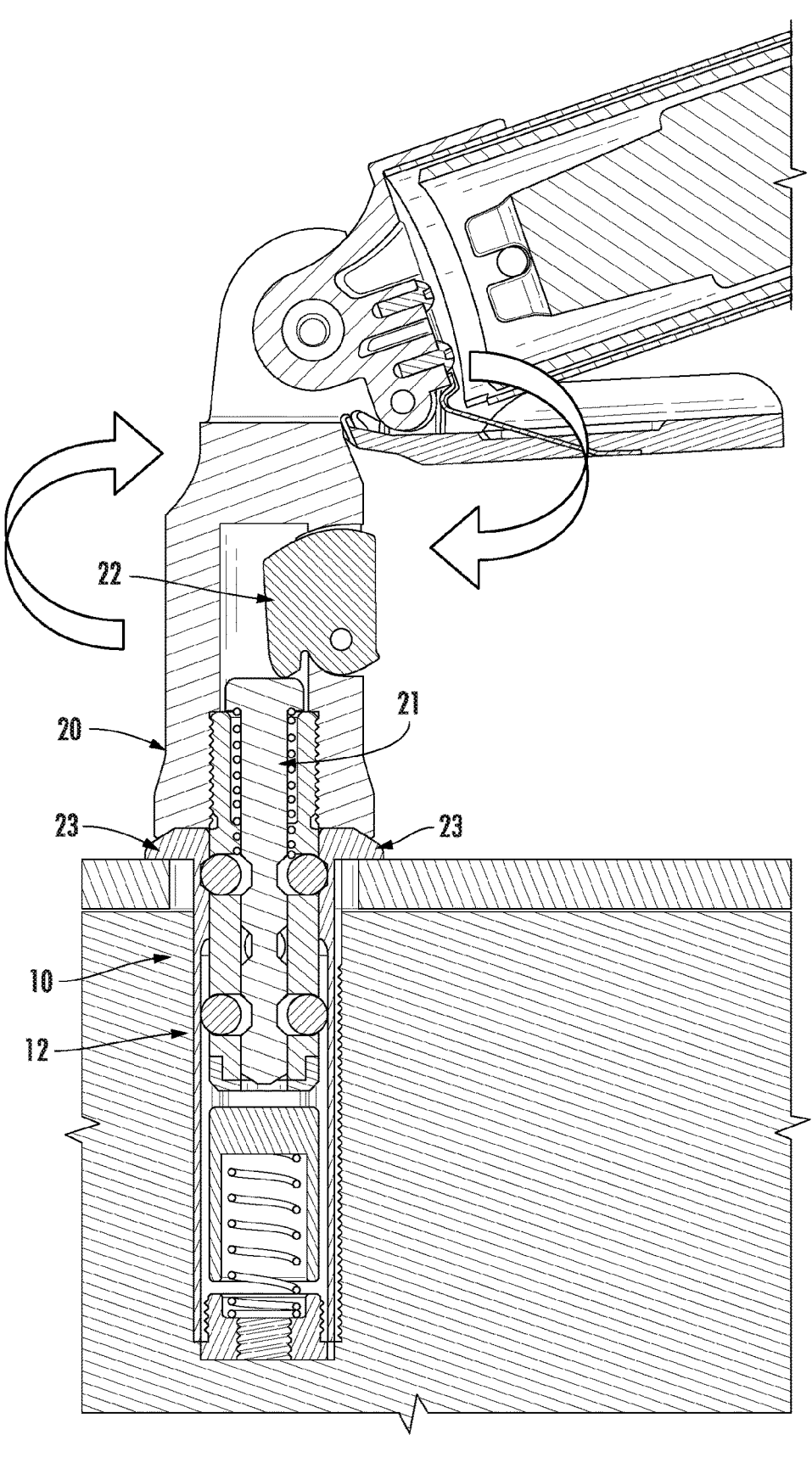

FIGS. 7D and 7E respectively illustrate, in longitudinal deeper sectional views, locked and unlocked conditions of the subject matter of present FIG. 7C. In particular, in FIG. 7D, actuation switch or toggle 22 is free to be pushed outward by included spring forces as illustrated (such as by use of one or more springs or other resilient features). In such position, the interacting elements of base 12 and pin feature 20 are engaged for securement (locked position) of the upper feature (20) relative to the lower feature (base 12). In FIG. 7E, such actuation switch or toggle is depressed by a user against the spring/resilient forces (pivoting around an indicated pivot point), so that the interacting elements of base 12 and pin feature 20 are not engaged, for freedom of movement of the upper feature (20) relative to the lower feature (base 12). For example, upper feature 20 may rotate in 360 degree motion relative to base feature 12 as represented by the two circular arrows of FIG. 7E. Likewise, upper feature may selectively be longitudinally placed in and/or withdrawn from base 12. Thus, when the actuation switch or toggle 22 is depressed by a user, the presently disclosed overall support system is in an unlocked condition thereof. When actuation switch or toggle 22 is free to move outward (FIG. 7D), the overall presently disclosed support system is in a locked condition thereof.

Further, FIGS. 7D and 7E (among others) illustrate that the base 12 serves as a receiver for the pin 20, which is an insert to the receiver. Thus, the insert (pin) and receiver (base) collectively serve as a quick release coupler system. As shown, a contoured plunger 21 is received within the pin 20. The contours of plunger provide recesses for receiving the balls whenever the coupler system is in an unlocked position. When toggle 22 is pivoted into the position shown in FIG. 7E, a dog or projection presses down against the extended head of plunger 21 so that it overcomes the opposing spring force. The balls then have room to move out of being seated into their associated grooves. Whenever toggle 22 is pivoted into the position shown in FIG. 7D, the coupler system is locked or engaged. As shown, protruding ridges alternate between the recesses along the length of plunger 21, to extend the balls radially outward into engagement with longitudinal grooves. The position of those longitudinal grooves are fixed by the relationship of the base with its supporting structure. Further, an annular stop 23 as shown is in place at the upper end of the grooves to lock the pin (insert) into the base (receiver).

FIGS. 7A through 7E represent use of the presently disclosed system with a rod holder feature 18. However, those of ordinary skill in the art will fully appreciate that other supported features may be used in conjunction with the presently disclosed system, as represented by FIG. 6B. Such representative examples are not intended as limiting. For example, other accessories (for example, such as a cleaning station or cooking grill, as otherwise discussed herein) could be supported by the presently disclosed system.

Figure 8A:
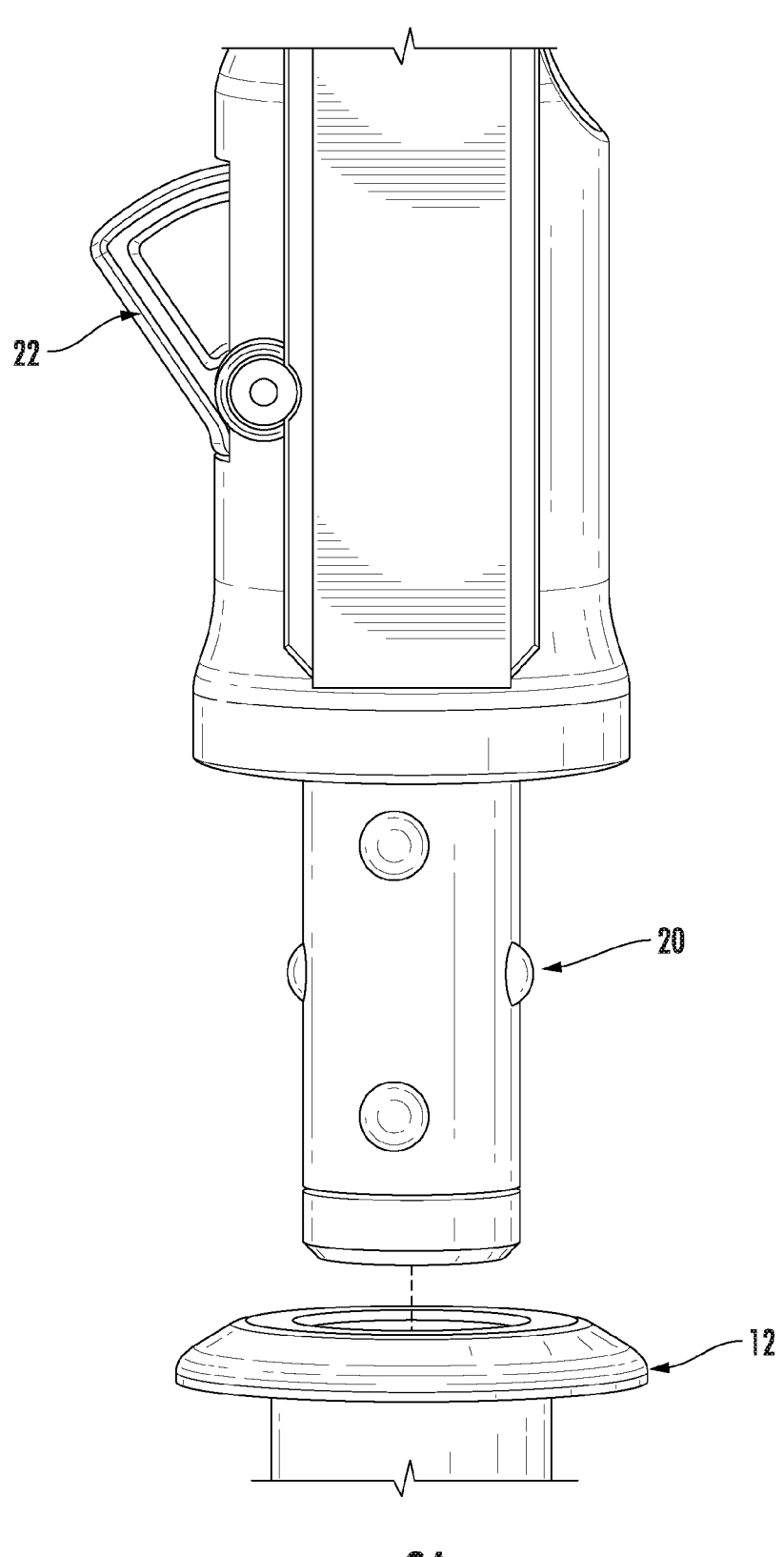
FIGS. 8A and 8B illustrate an external perspective in solid line and partial see-through, respectively, of an exemplary engaging or pin feature or member in accordance with presently disclosed subject matter, in locked condition thereof.
Figure 8B:
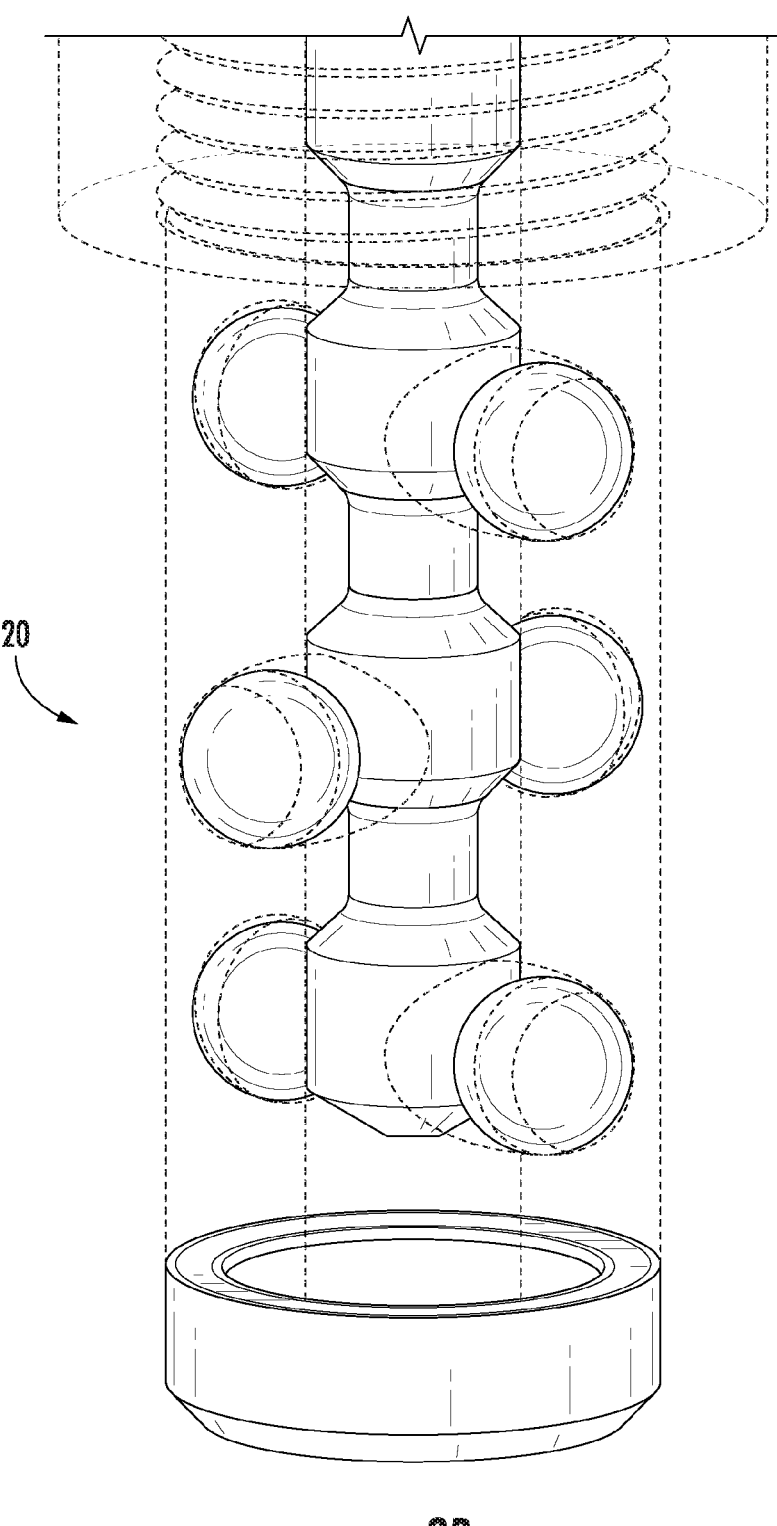

FIGS. 8A and 8B illustrate an external perspective in solid line and partial see-through, respectively, of an exemplary engaging or pin features or members in accordance with presently disclosed subject matter, in locked condition thereof. FIG. 8A also shows actuation switch or toggle 22 affixed (such as by a set screw arrangement or otherwise) onto an upper portion of member 20. The illustration of FIG. 8B is generally enlarged relative to that of FIG. 8A.

Figure 8C:
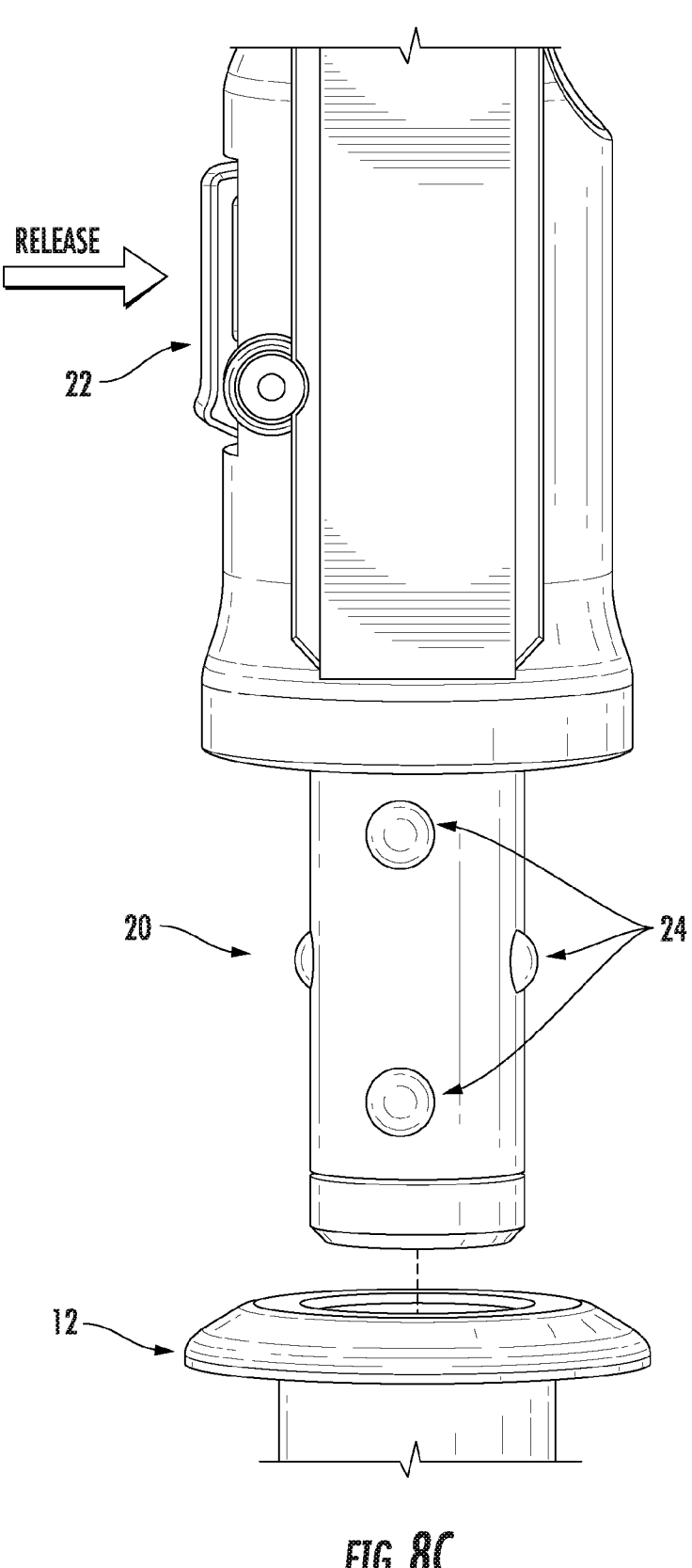
FIGS. 8C and 8D illustrate an external perspective in solid line and partial see-through, respectively, of an exemplary engaging or pin feature or member in accordance with presently disclosed subject matter, in unlocked condition thereof.
Figure 8D:
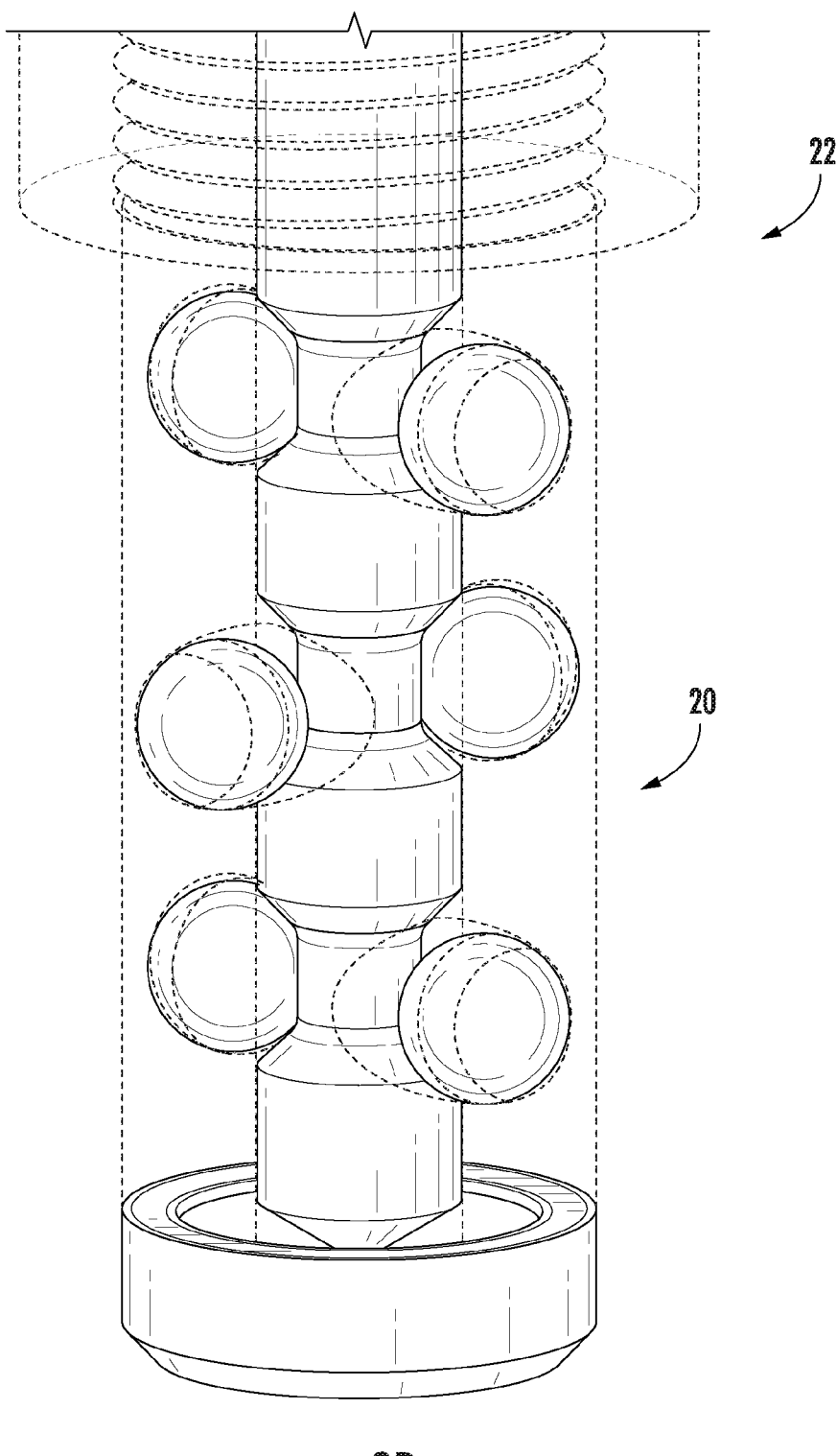

FIGS. 8C and 8D represent an external perspective in solid line and partial see-through, respectively, of an exemplary engaging or pin features or members generally 20 in accordance with presently disclosed subject matter, in unlocked condition thereof. In other words, actuation switch or toggle 22 is depressed by a user, so that balls 24 can be disengaged from base 12 to permit relative movement between 12 and 20, as will be understood by those or ordinary skill in the art without further detailed discussion. The illustration of FIG. 8D is generally enlarged relative to that of FIG. 8C.

Figure 8E:
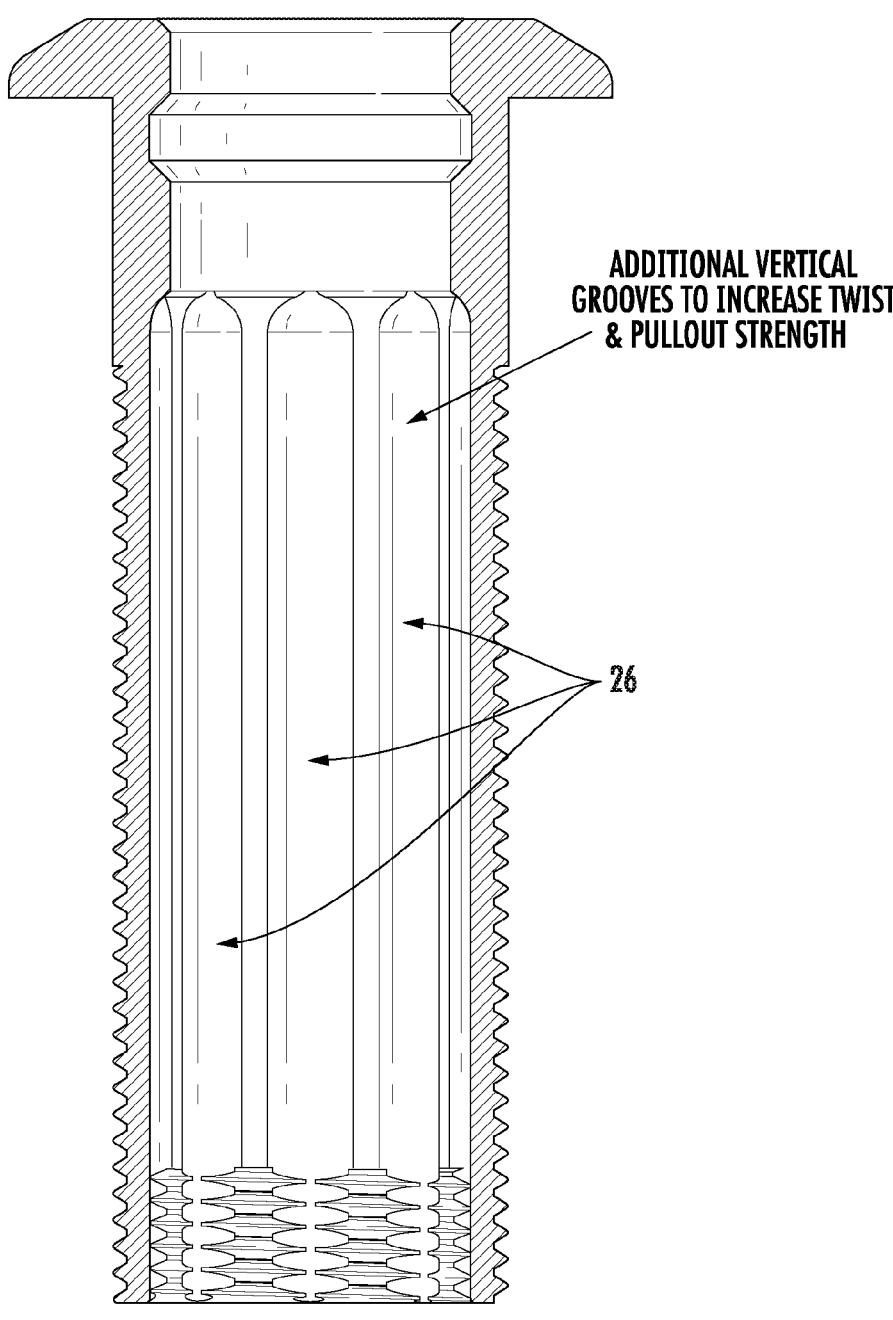
FIG. 8E illustrates a perspective view in partial cutaway of an exemplary base feature or member in accordance with the presently disclosed subject matter, shown in isolation (not in position relative to an associated supporting marine environment)

FIG. 8E illustrates a perspective view in partial cutaway of an exemplary base feature or member generally 12 in accordance with the presently disclosed subject matter, shown in isolation (not in position relative to an associated supporting marine environment). In particular, various hole, groove, and threaded members or elements generally 26 of base 12 are illustrated, for interaction with other features of the presently disclosed subject matter, as will be understood by those of ordinary skill in the art without further detailed discussion. The relatively higher number of additional vertical grooves increase twist and pullout strength, while external threading around base 12 facilitate its seating into support 10.

Figure 9A:
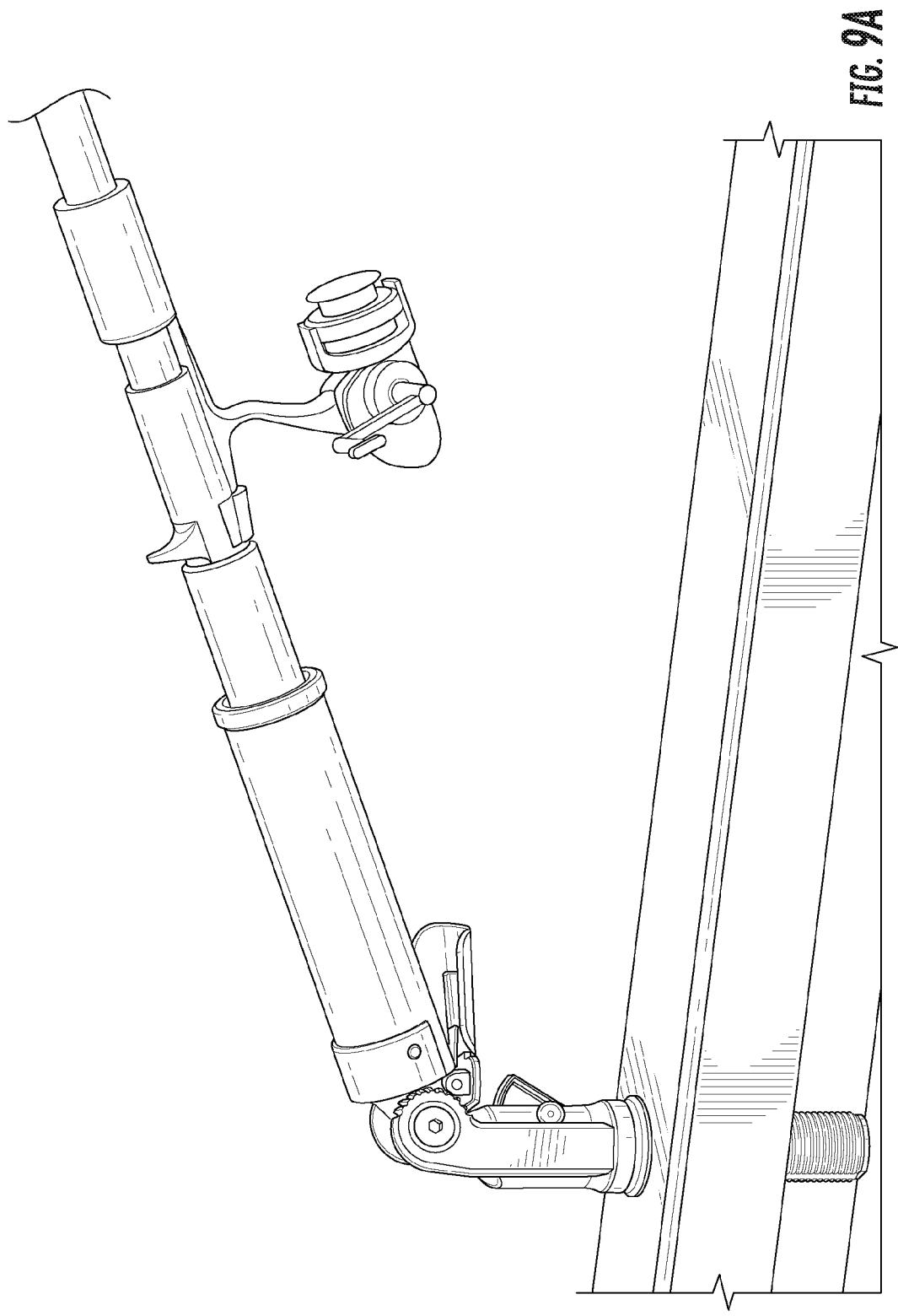
FIGS. 9A and 9B illustrate generally perspective views (with 9B partial of the FIG. 9A illustration) of an exemplary rod holder mounted and unmounted in a marine environment in accordance with presently disclosed subject matter.
Figure 9B:
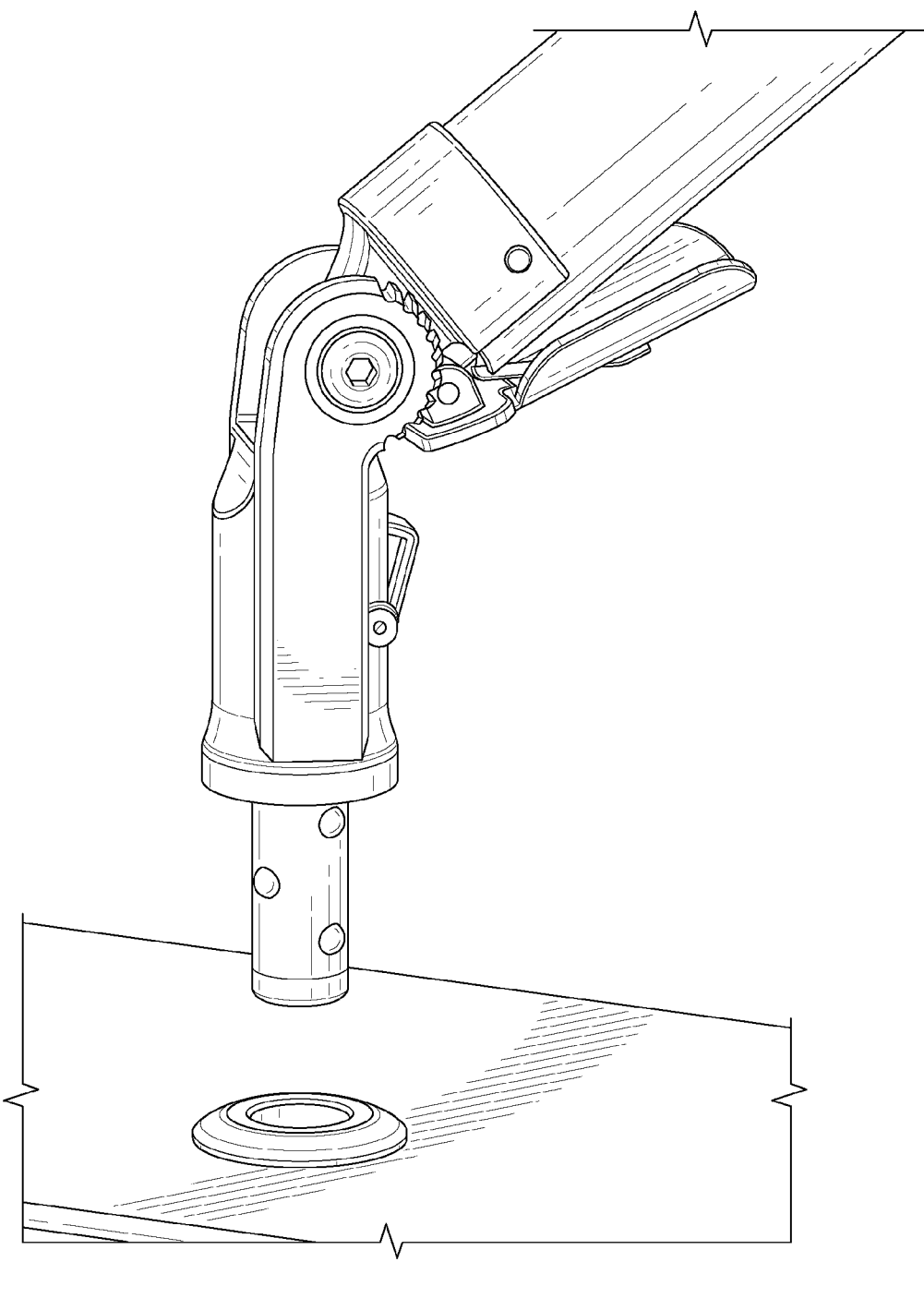

FIGS. 9A and 9B illustrate generally perspective views of an exemplary rod holder mounted and unmounted in a marine environment in accordance with presently disclosed subject matter. FIG. 9B illustrates only a portion of the subject matter of the FIG. 9A illustration.

Figure 10A:
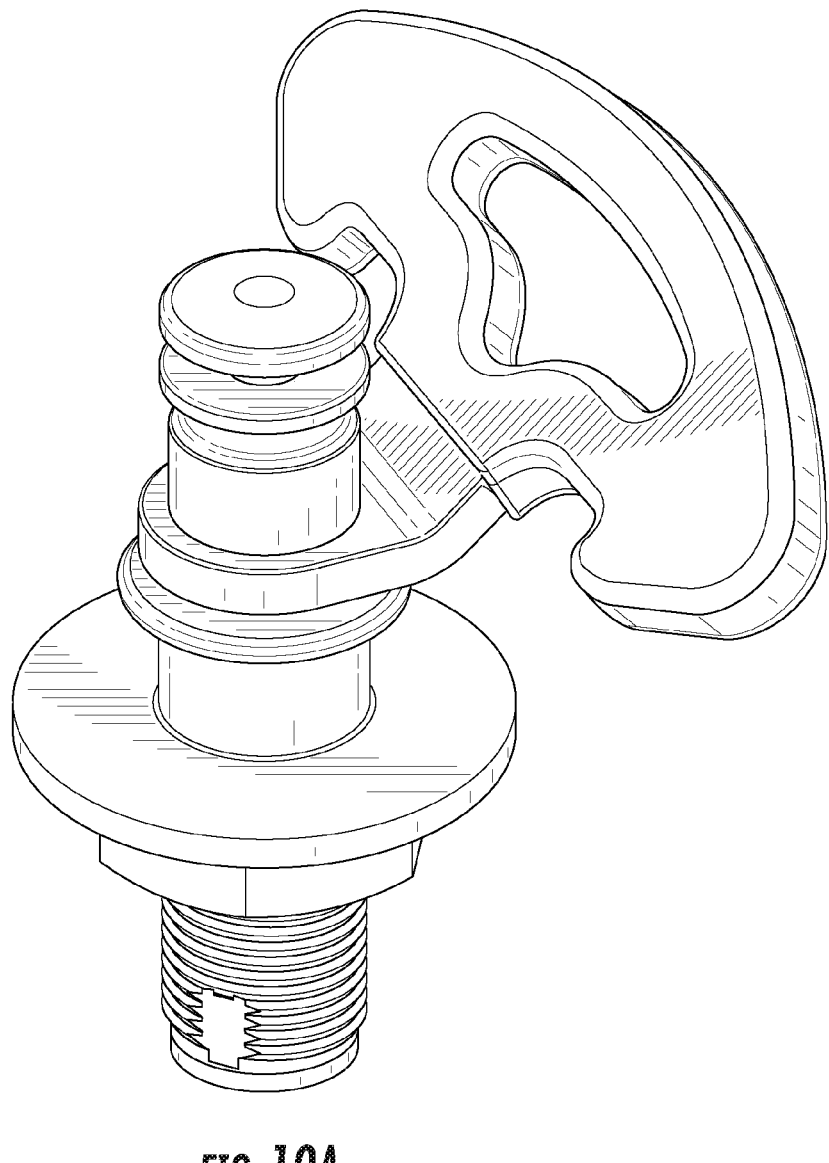
FIGS. 10A and 10B illustrate external perspectives in composite and exploded positions, respectively, of docking and bumper cleat subject matter for use with presently disclosed subject matter.
Figure 10B:
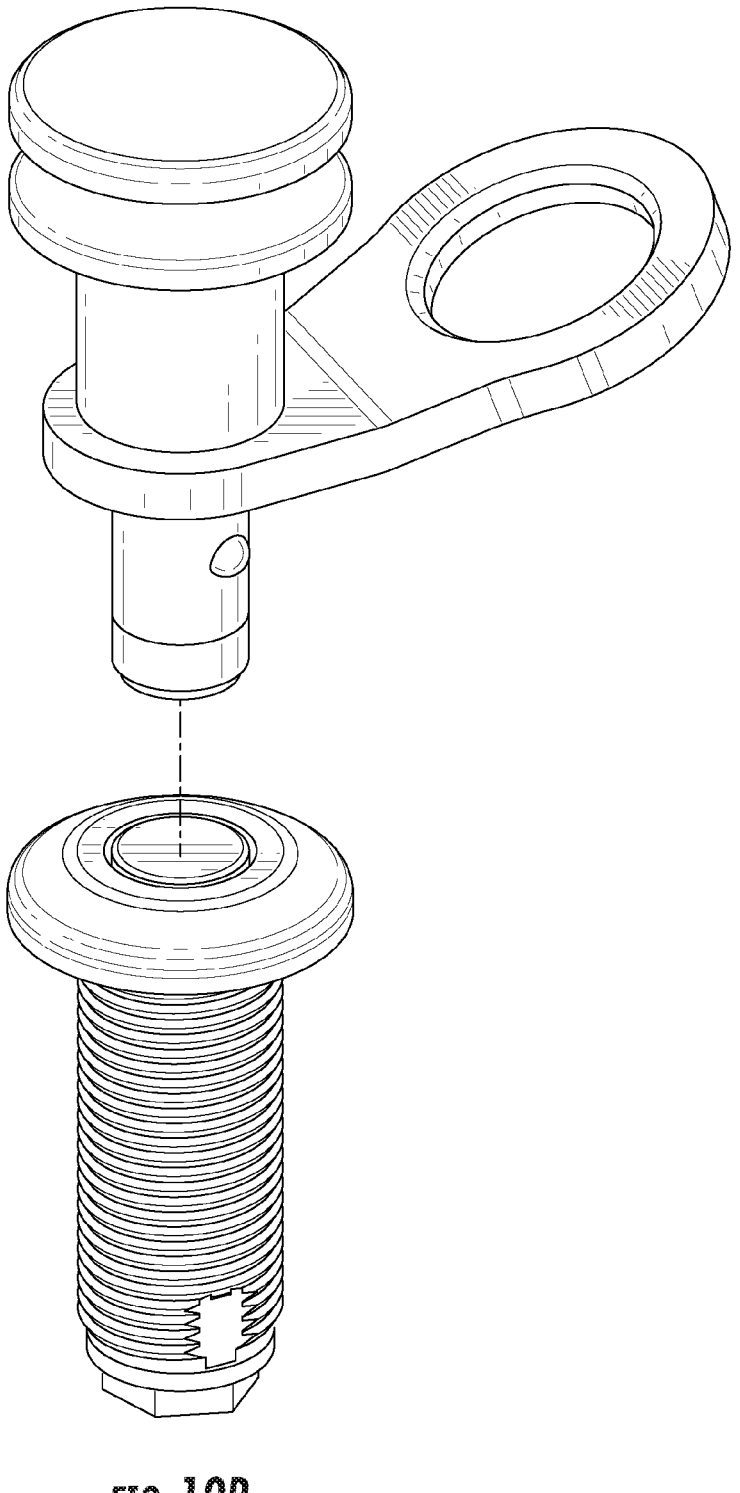
Figure 10C:
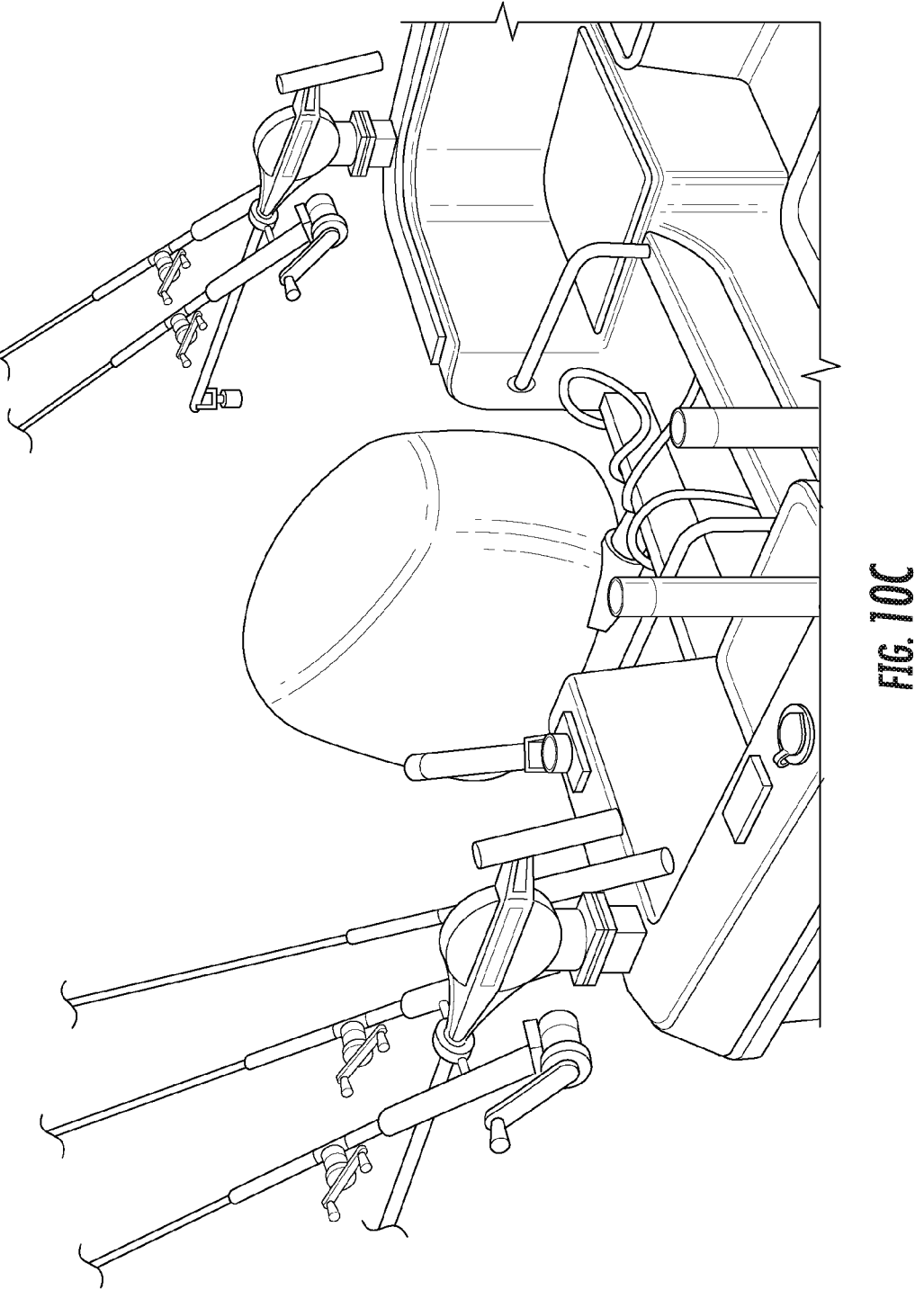
FIG. 10C illustrates downrigger environment for use with presently disclosed subject matter.

FIGS. 10A and 10B illustrate external perspectives in composite and exploded positions, respectively, of docking and bumper cleat subject matter for use with presently disclosed subject matter;

FIG. 10C illustrates downrigger environment for use with presently disclosed subject matter.

Figure 10D:
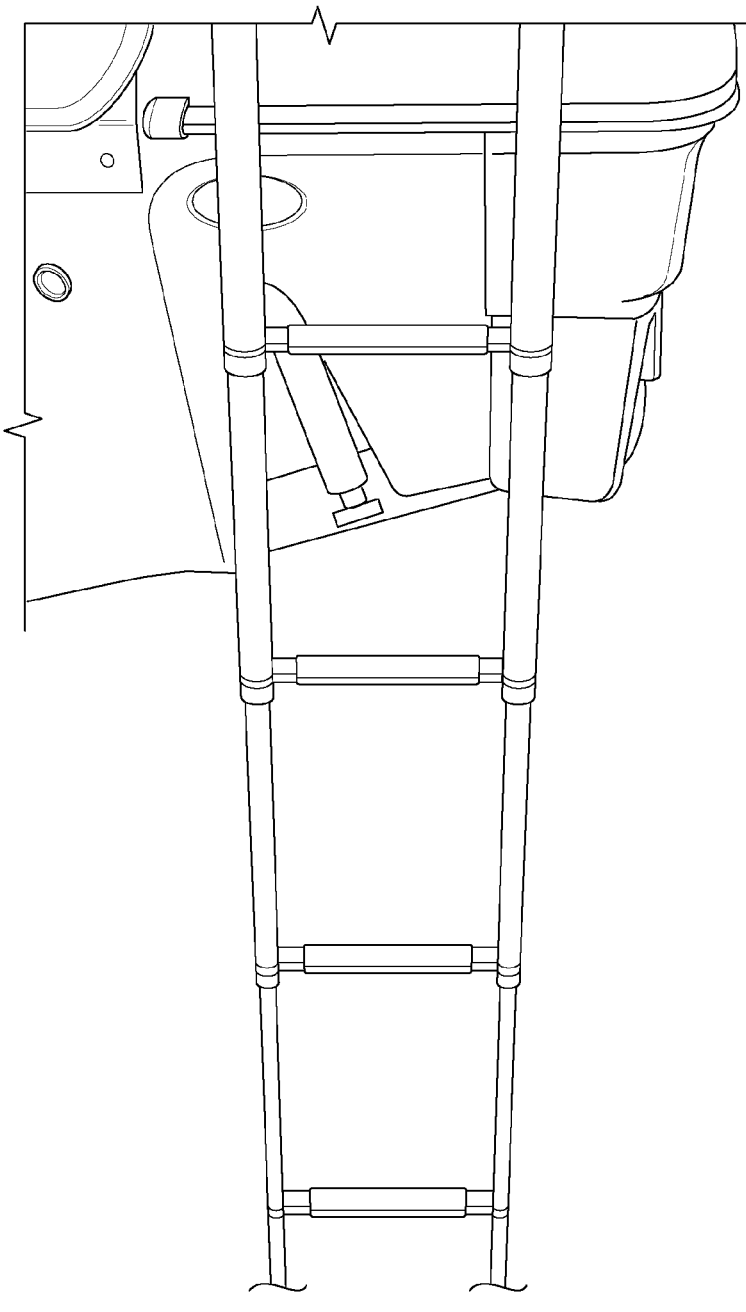
FIG. 10D illustrates a boat or pontoon ladder environment for use with presently disclosed subject matter.

FIG. 10D illustrates a boat or pontoon ladder environment for use with presently disclosed subject matter.

Figure 10E:
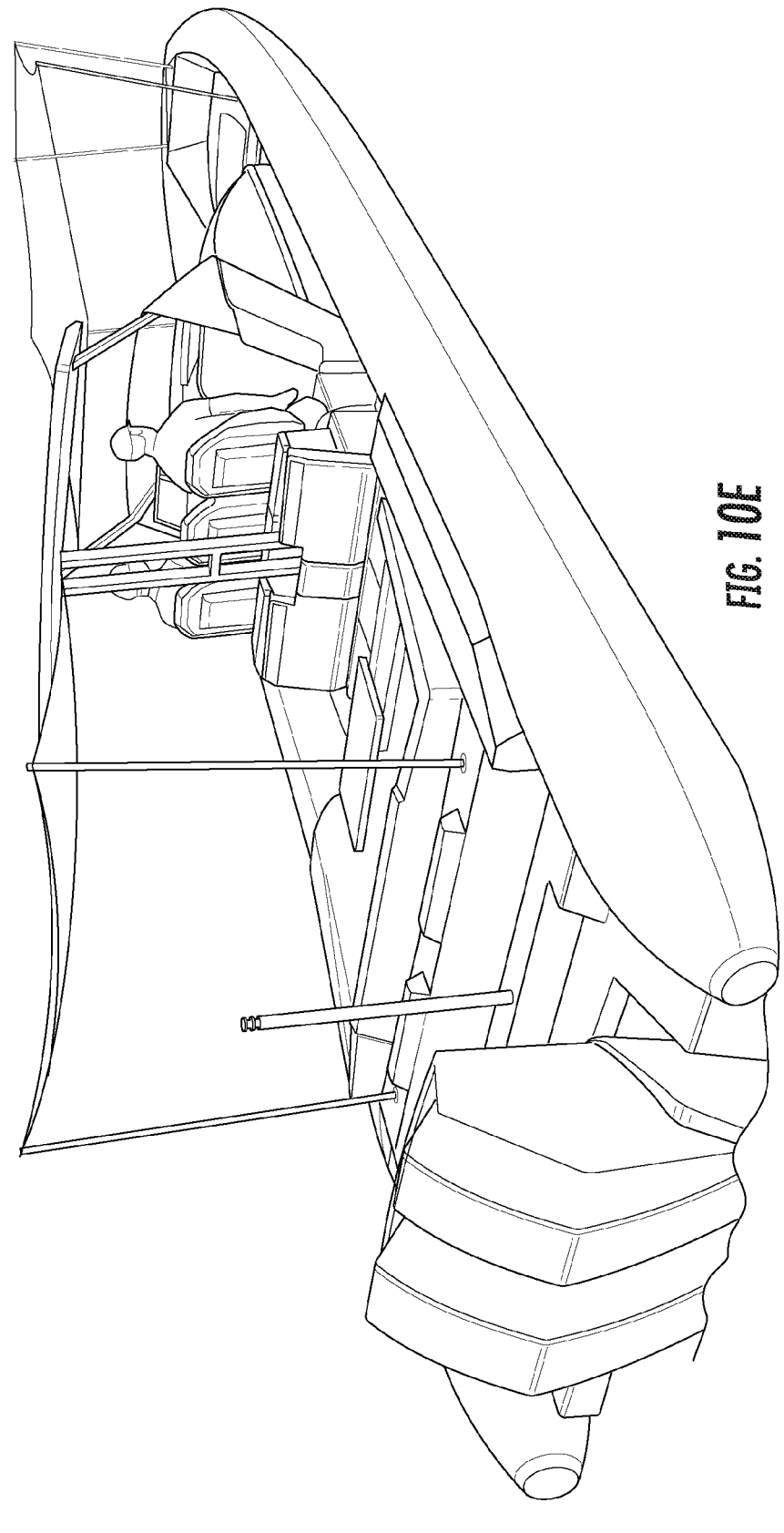
FIG. 10E illustrates a boat or pontoon canopy environment for use with presently disclosed subject matter.

FIG. 10E illustrates a boat or pontoon canopy environment for use with presently disclosed subject matter.

Figure 10F:
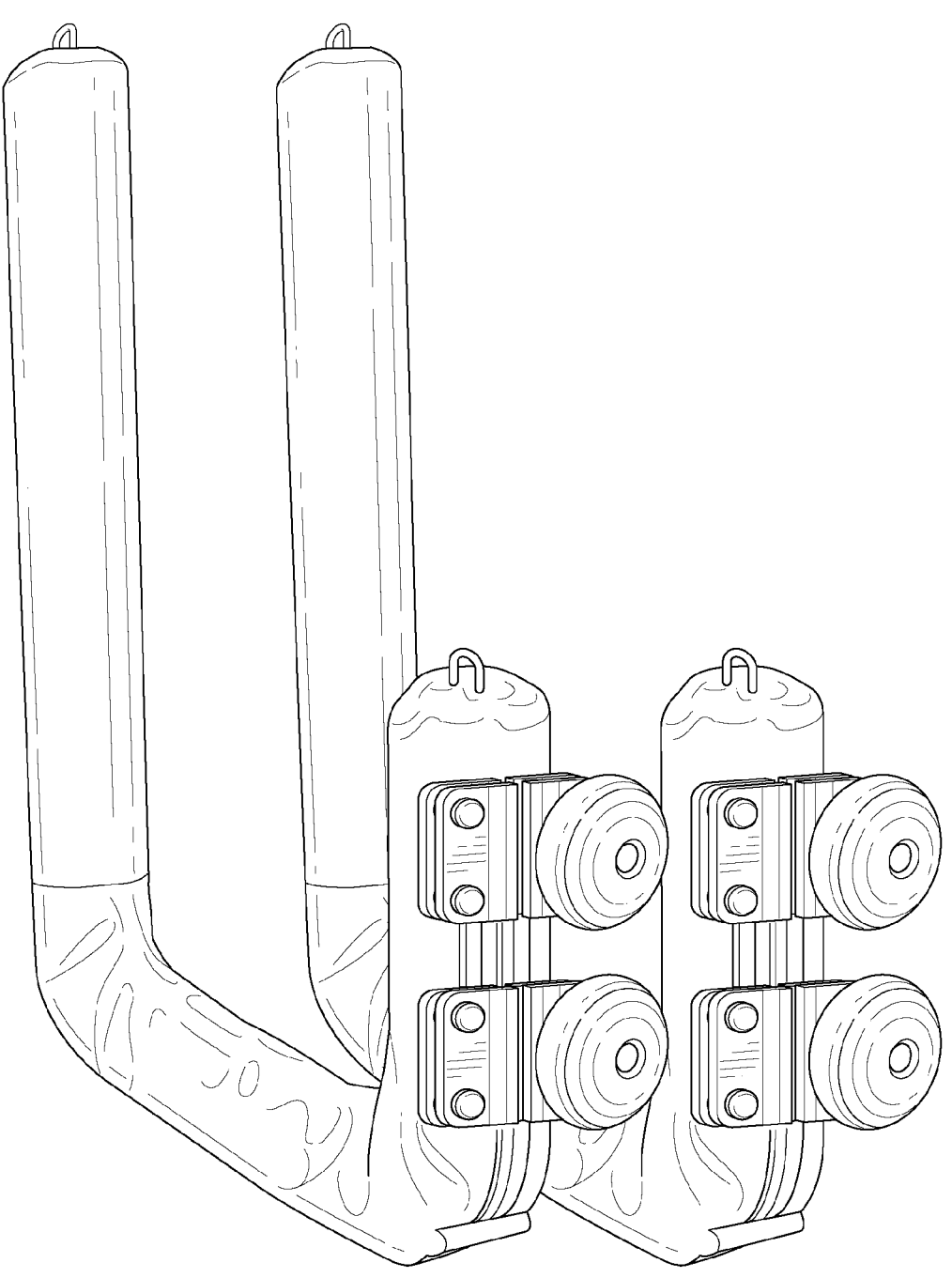
FIG. 10F illustrates a kayak rod holder environment for use with presently disclosed subject matter.

FIG. 10F illustrates a kayak rod holder environment for use with presently disclosed subject matter.

Figure 10G:
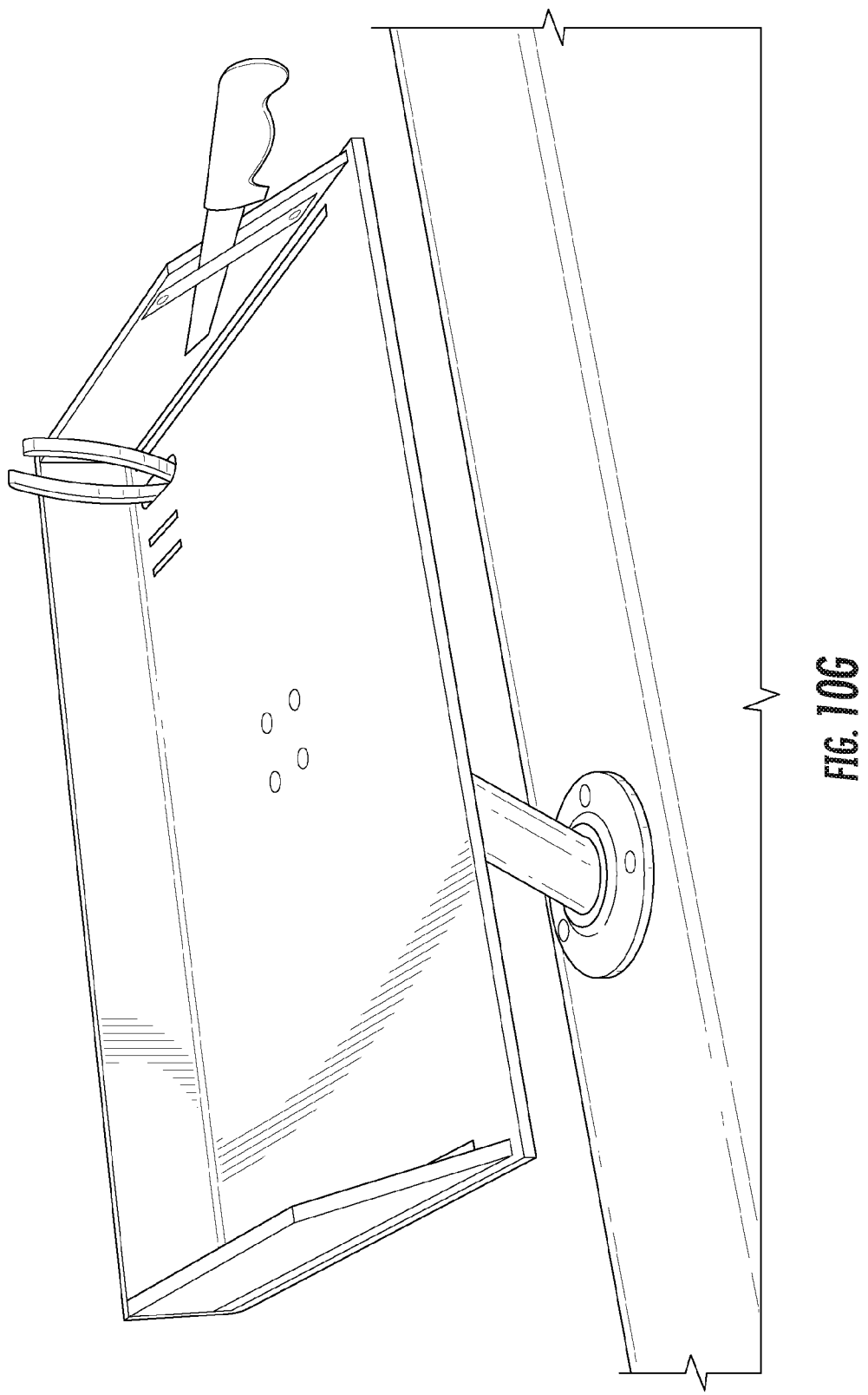
FIG. 10G illustrates a boat or pontoon cleaning table environment for use with presently disclosed subject matter.

FIG. 10G illustrates a boat or pontoon cleaning table environment for use with presently disclosed subject matter.

Figure 10H:
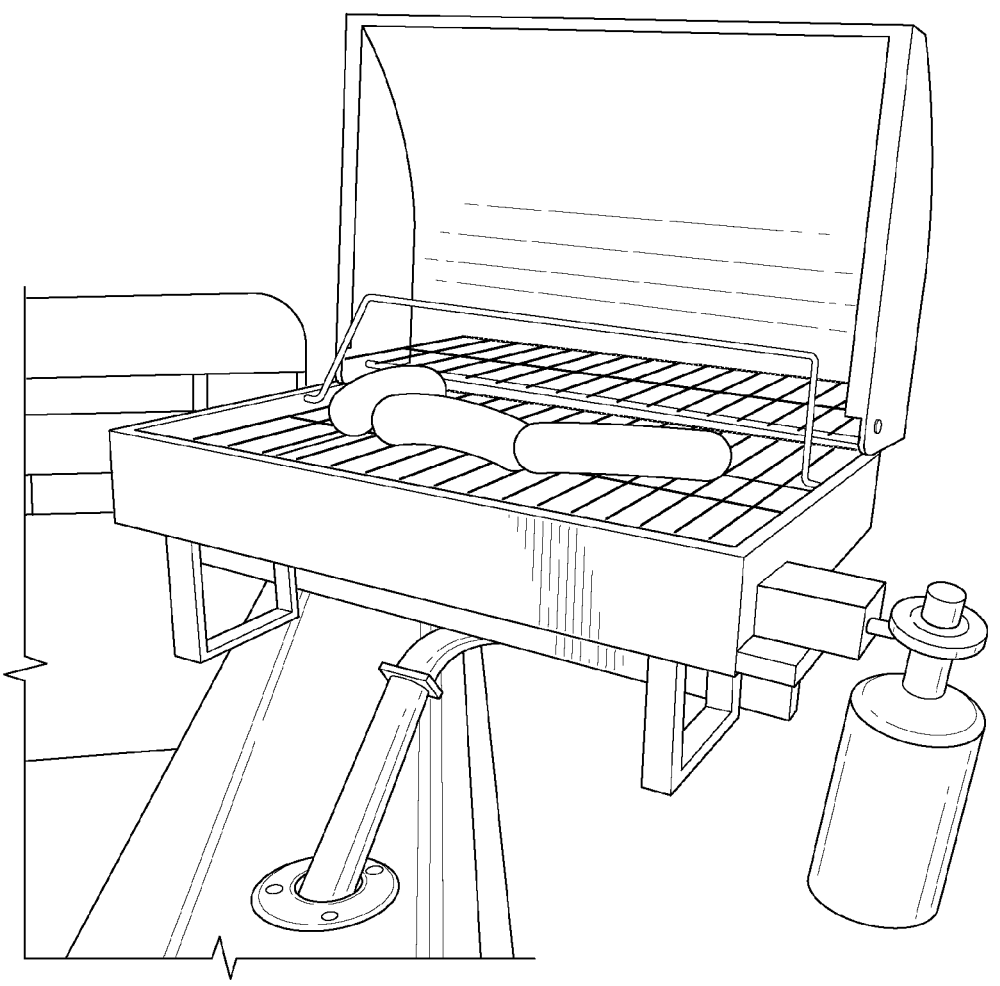
FIG. 10H illustrates a boat or pontoon grill environment for use with presently disclosed subject matter.

FIG. 10H illustrates a boat or pontoon grill environment for use with presently disclosed subject matter.

Figure 10I:
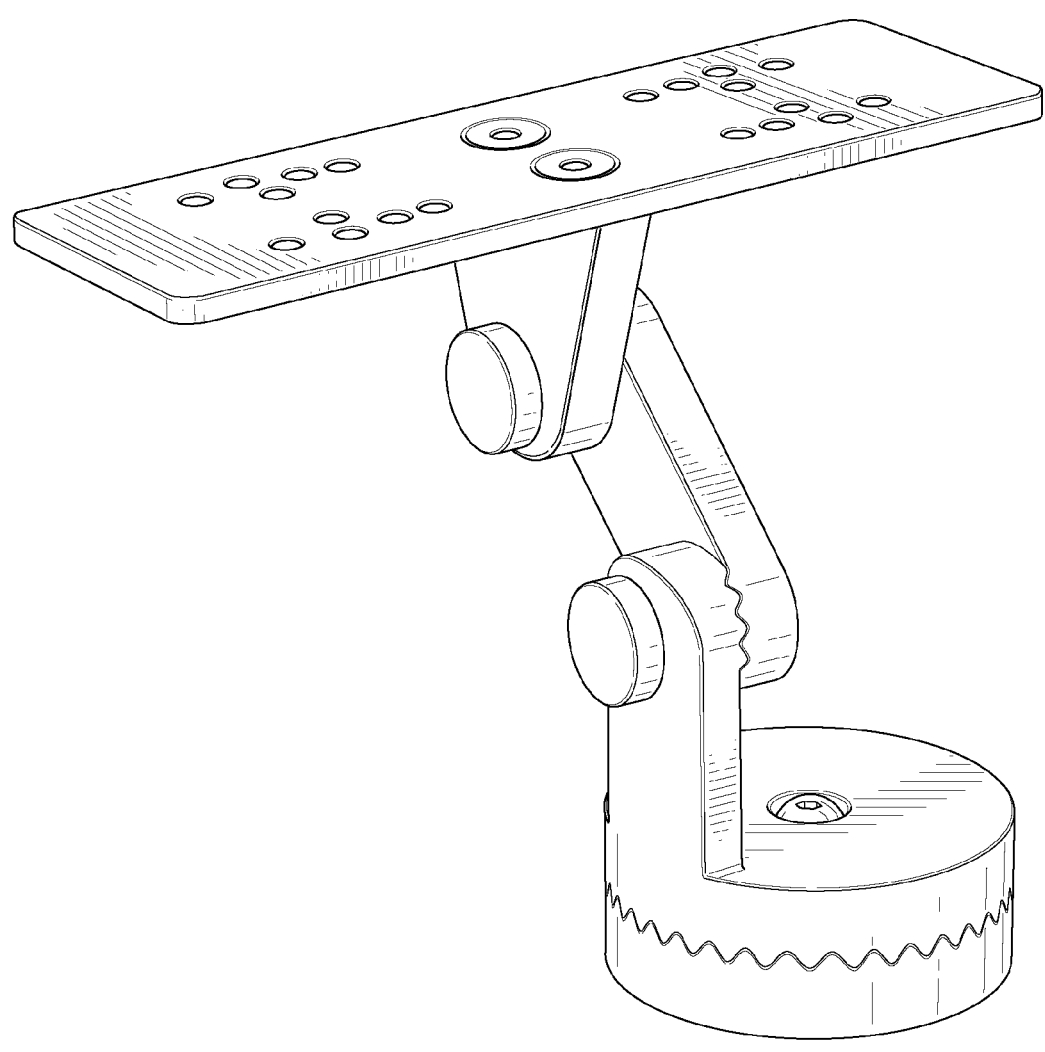
FIGS. 10I, 10J, and 10K illustrate respectively quick connect depth, fish finder, and GPS mounts, respectively, for use with presently disclosed subject matter.
Figure 10J:
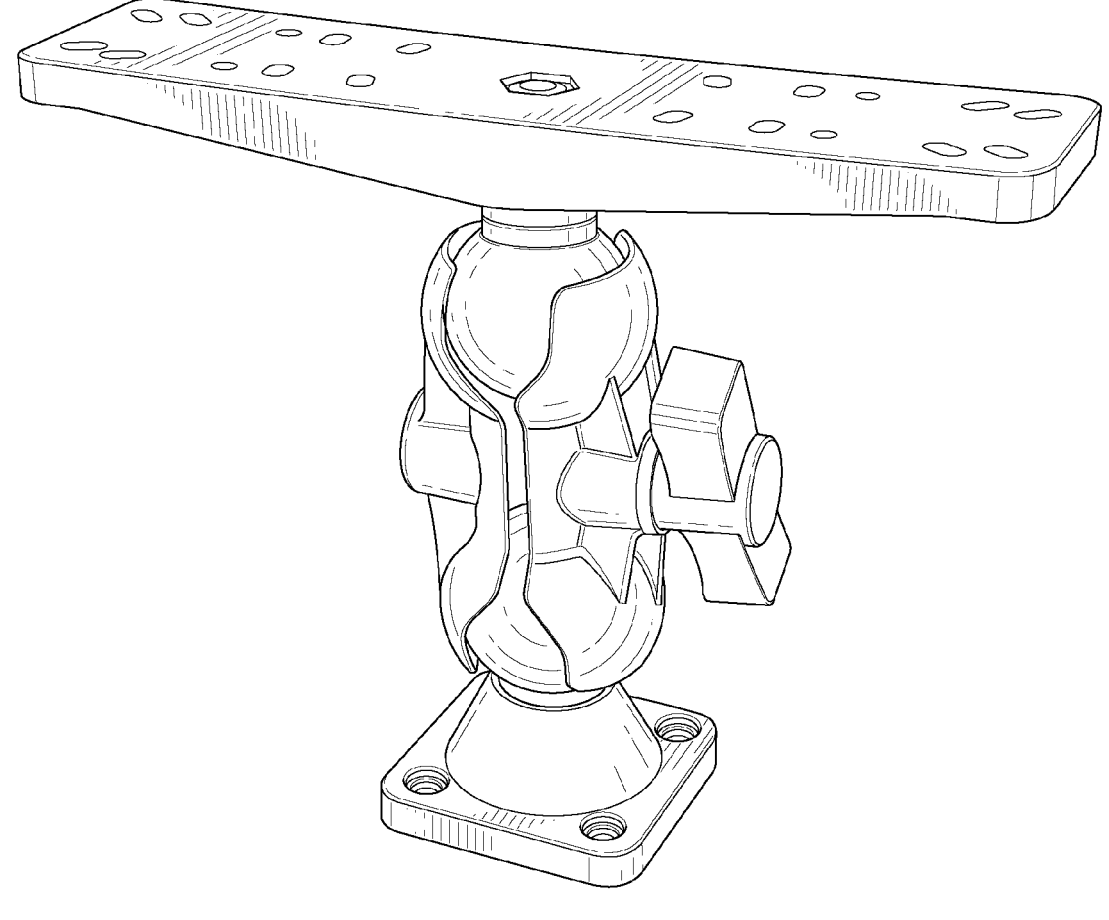
Figure 10K:
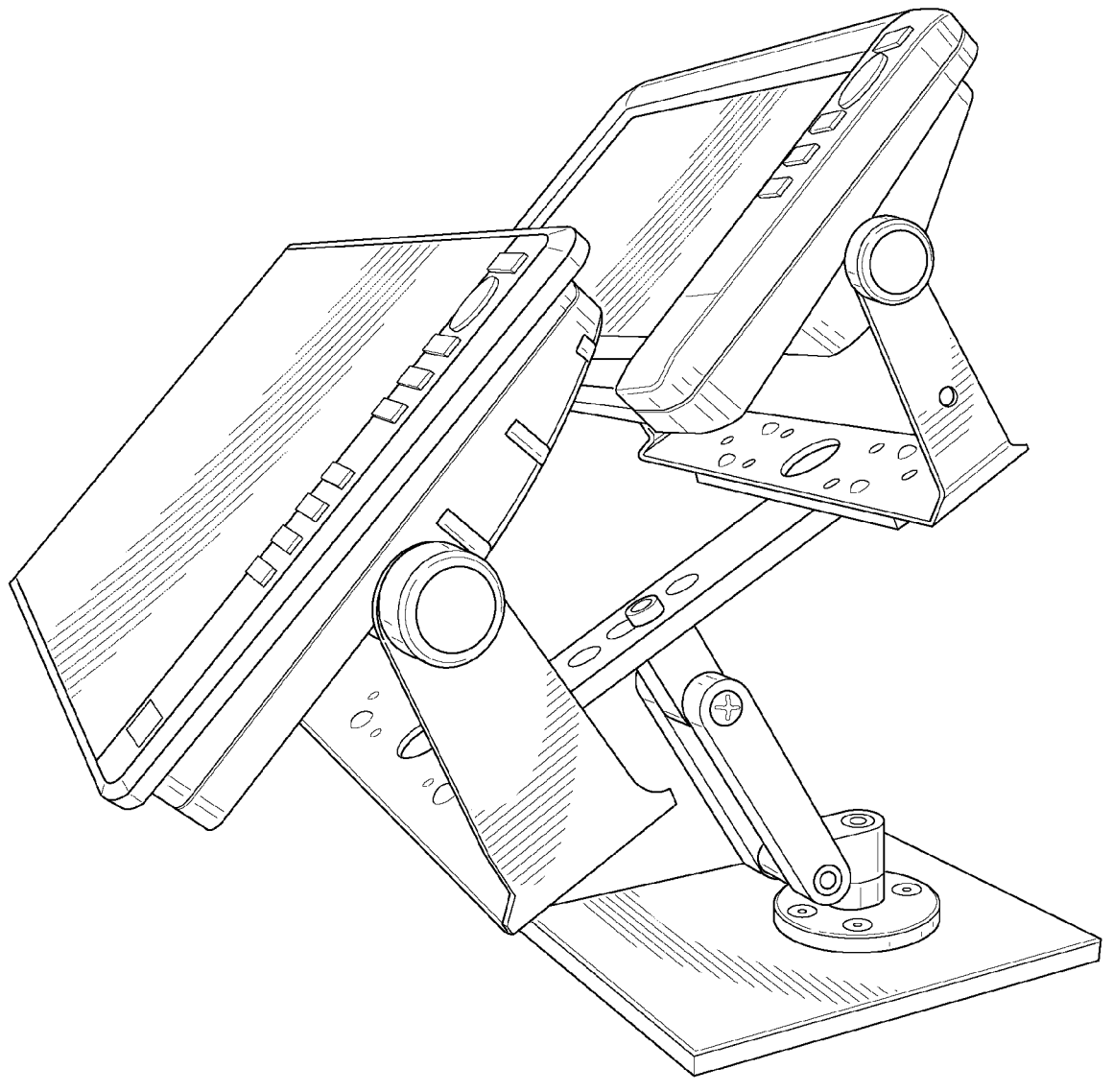

FIGS. 10I, 10J, and 10K illustrate respectively quick connect depth, fish finder, and GPS mounts, respectively, for use with presently disclosed subject matter.

While the presently disclosed subject matter has been described in detail with respect to specific embodiments thereof, it will be appreciated that those skilled in the art, upon attaining an understanding of the foregoing, may readily produce alterations to, variations of, and/or equivalents to such embodiments. Accordingly, the scope of the present disclosure is by way of example rather than by way of limitation, and the subject disclosure does not preclude inclusion of such modifications, variations, and/or additions to the presently disclosed subject matter as would be readily apparent to one of ordinary skill in the art.

What is claimed is:

1. A quick release mounting system for interchangeable marine accessories configured to be mounted along a supporting railing area of a water craft, comprising:

a receiving base configured for being mounted along a supporting railing area of an associated water craft, with at least a portion of the base configured to extend below an upper surface of the railing area, the base defining a plurality of longitudinal grooves along a portion of the length thereof, and defining an elongated recess adjacent the grooves and configured for receiving an insert;

a pin insert configured for selective insertion by a user into the base elongated recess, wherein the insert includes a contoured plunger axially movable within the recess, and a plurality of partially captured balls radially movable relative to the insert; and a pivoting toggle mounted on the insert for selectively moving the mounting system into a locked position whereby the plurality of balls are forced radially outward by the contoured plunger into contact with the plurality of longitudinal grooves to provide rotational locking positions, and for selectively moving the mounting system into an unlocked position whereby the plurality of balls are freed by the contoured plunger to move radially inward out of contact with the plurality of longitudinal grooves.

2. The quick release mounting system according to claim 1, further including either of an annular stop or a peripheral spherical groove for interaction with the plurality of balls for capturing the insert from being withdrawn whenever the mounting system is selectively moved into its locked position.

3. The quick release mounting system according to claim 2, further including a spring for biasing the contoured plunger into a locked position for the mounting system, and wherein movement of the pivoting toggle moves the plunger against the spring bias for moving the mounting system into an unlocked position.

4. The quick release mounting system according to claim 2, wherein the receiving base is configured to be flush mounted to the supporting railing area, with one of said plurality of balls aligned for being received in a respective one of the plurality of longitudinal grooves whenever the insert is received in the base.

5. The quick release mounting system according to claim 4, wherein the pin insert includes a number of rows of said plurality of balls along a portion of the length of the insert.

6. The quick release mounting system according to claim 5, wherein the pin insert includes up to four rows of said plurality of balls along a portion of the length of the insert, and the plurality of longitudinal grooves of the receiving base includes up to eight longitudinal grooves spaced equidistantly about the base.

7. The quick release mounting system according to claim 4, wherein the receiving base, the pin insert, and the plurality of balls comprise reinforced materials.

8. The quick release mounting system according to claim 1, wherein the pin insert is configured to be associated with one of a number of interchangeable marine accessories, for being selectively mounted onto an associated water craft.

9. The quick release mounting system according to claim 8, wherein:

the associated water craft comprises one of a kayak, a boat, and a pontoon; and the interchangeable marine accessory configured to be selectively mounted on the water craft comprises one of a rod holder, a pivoting rod holder, a multi-rod holder, a docking cleat, a bumper cleat, a downrigger configuration, a ladder, a canopy, a fish cleaning table, a grill, and a quick connect mount for a depth finder, a fish finder, and a GPS device.

10. A methodology for a quick release mounting system for using interchangeable marine accessories on a supporting railing area of a water craft, comprising:

mounting a receiving base along a supporting railing area of an associated water craft, with at least a portion of the base extending below the upper surface of the railing area, the base defining a plurality of longitudinal grooves along a portion of the length thereof, and defining an elongated recess adjacent the grooves and configured for receiving an insert; and selectively inserting a pin insert into the base elongated recess, wherein the insert includes a contoured plunger axially movable within the recess, and a plurality of partially captured balls radially movable relative to the insert, and with a pivoting toggle mounted on the insert for selectively moving the mounting system into a locked position whereby the plurality of balls are forced radially outward by the contoured plunger into contact with the plurality of longitudinal grooves to provide rotational locking positions, and for selectively moving the mounting system into an unlocked position whereby the plurality of balls are freed by the contoured plunger to move radially inward out of contact with the plurality of longitudinal grooves.

11. The methodology for a quick release mounting system according to claim 10, further including an annular stop or a peripheral spherical groove for interaction with the plurality of balls for capturing the insert from being withdrawn whenever the mounting system is selectively moved into its locked position.

12. The methodology for a quick release mounting system according to claim 11, further including a spring for biasing the contoured plunger into a locked position for the mounting system, and with the pivoting toggle configured to move the plunger against the spring bias for moving the mounting system into an unlocked position.

13. The methodology for a quick release mounting system according to claim 11, wherein the receiving base is flush mounted to the supporting railing area, with one of said plurality of balls aligned for being received in a respective one of the plurality of longitudinal grooves whenever the insert is received in the base.

14. The methodology for a quick release mounting system according to claim 13, wherein the pin insert includes a number of rows of said plurality of balls along a portion of the length of the insert.

15. The methodology for a quick release mounting system according to claim 14, wherein the pin insert includes up to four rows of said plurality of balls along a portion of the length of the insert, and the plurality of longitudinal grooves of the receiving base includes up to eight longitudinal grooves spaced equidistantly about the base.

16. The methodology for a quick release mounting system according to claim 13, wherein the receiving base, the pin insert, and the plurality of balls comprise reinforced materials.

17. The methodology for a quick release mounting system according to claim 10, wherein the pin insert is configured to be associated with one of a number of interchangeable marine accessories, for being selectively mounted onto an associated water craft.

18. The methodology for a quick release mounting system according to claim 17, wherein:

the associated water craft comprises one of a kayak, a boat, and a pontoon; and the interchangeable marine accessory configured to be selectively mounted on the water craft comprises one of a rod holder, a pivoting rod holder, a multi-rod holder, a docking cleat, a bumper cleat, a downrigger configuration, a ladder, a canopy, a fish cleaning table, a grill, and a quick connect mount for a depth finder, a fish finder, and a GPS device.

19. A quick release base/pin mounting system that allows a user to quickly relocate or remove a selected interchangeable marine accessory from one location to another along a supporting railing area of a water craft by actuating the pin to release it from the base, comprising:

a receiving base configured for being flush mounted along a supporting railing area of an associated water craft, with the base configured to extend below an upper surface of the railing area, the base defining a plurality of longitudinal grooves along a portion of the length thereof, and defining an elongated recess adjacent the grooves and configured for receiving an insert;

a pin insert configured for selective insertion by a user into the base elongated recess, wherein the insert includes a contoured plunger axially movable within the recess, and at least one partially captured ball for each respective longitudinal groove of the plurality of longitudinal grooves, and radially movable relative to the insert;

a pivoting toggle mounted on the insert for selectively moving the mounting system into a locked position whereby the at least one ball for each respective longitudinal groove is forced radially outward by the contoured plunger into contact with the plurality of longitudinal grooves to provide rotational locking positions, and for selectively moving the mounting system into an unlocked position whereby the at least one ball for each respective longitudinal groove is freed by the contoured plunger to move radially inward out of contact with the plurality of longitudinal grooves; and at least one of an annular stop or a peripheral spherical groove for interaction with the balls for capturing the insert from being withdrawn whenever the mounting system is selectively moved into its locked position.

20. The quick release base/pin mounting system according to claim 19, further including a spring for biasing the contoured plunger into a locked position for the mounting system, and wherein movement of the pivoting toggle moves the plunger against the spring bias for moving the mounting system into an unlocked position.

21. The quick release base/pin mounting system according to claim 19, wherein:

the pin insert includes up to four rows of said balls along a portion of the length of the insert; the receiving base includes up to eight longitudinal grooves spaced equidistantly about the base; and the interchangeable marine accessory configured to be selectively mounted on the water craft comprises one of a rod holder, a pivoting rod holder, a multi-rod holder, a docking cleat, a bumper cleat, a downrigger configuration, a ladder, a canopy, a fish cleaning table, a grill, and a quick connect mount for a depth finder, a fish finder, and a GPS device.

* * * * *